United States Patent
Nordstrom et al.

(10) Patent No.: US 12,418,777 B2
(45) Date of Patent: *Sep. 16, 2025

(54) SYSTEMS AND METHODS FOR ESTABLISHING COMMUNICATIONS BETWEEN MOBILE DEVICE USERS

(71) Applicant: Panther Innovations, LLC, Tyler, TX (US)

(72) Inventors: Christopher Andrew Nordstrom, Duxbury, MA (US); Romit Roy Choudhury, Champaign, IL (US)

(73) Assignee: Panther Innovations, LLC, Tyler, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/667,990

(22) Filed: Feb. 9, 2022

(65) Prior Publication Data

US 2022/0174457 A1 Jun. 2, 2022

Related U.S. Application Data

(63) Continuation of application No. 16/673,099, filed on Nov. 4, 2019, now abandoned, which is a
(Continued)

(51) Int. Cl.
*H04L 51/52* (2022.01)
*G06F 16/583* (2019.01)
(Continued)

(52) U.S. Cl.
CPC ............ *H04W 4/21* (2018.02); *G06F 16/583* (2019.01); *H04L 51/52* (2022.05); *H04L 67/306* (2013.01);
(Continued)

(58) Field of Classification Search
CPC ....... H04W 4/21; G06F 16/583; H04M 1/724; H04L 51/52; H04L 9/40; H04L 69/329
(Continued)

(56) References Cited

U.S. PATENT DOCUMENTS

| | | |
|---|---|---|
| 6,529,136 B2 | 3/2003 | Cao et al. |
| 6,618,593 B1 | 9/2003 | Drutman et al. |

(Continued)

FOREIGN PATENT DOCUMENTS

| | | | | |
|---|---|---|---|---|
| CA | 2688210 A1 * | 12/2008 | ............. | G06Q 30/02 |
| CA | 2701714 A1 * | 6/2009 | ........... | H04L 67/306 |

(Continued)

OTHER PUBLICATIONS

Non-Final Office Action in U.S. Appl. No. 16/673,099 dated Feb. 4, 2021; 9 pages.
(Continued)

*Primary Examiner* — Khanh Q Dinh
(74) *Attorney, Agent, or Firm* — Schmeiser, Olsen & Watts LLP; Timothy P. Collins, Esq.

(57) ABSTRACT

Provided are systems and methods for establishing a communication between mobile device users that register with a collaboration system. The collaboration system determines a match between profile data of the first registered mobile device and profile data of the second registered mobile device. Displayed at the first registered mobile device is a first list of user identifications, which includes an identification of a user of the second registered mobile device and an identification of a user of at least one other mobile device. Displayed at the second registered mobile device is a second list of user identifications. The second list includes an identification of a user of the first registered mobile device and an identification of at least one other mobile device user.

12 Claims, 7 Drawing Sheets

Related U.S. Application Data continuation of application No. 16/178,766, filed on Nov. 2, 2018, now Pat. No. 10,516,979, which is a continuation of application No. 16/041,179, filed on Jul. 20, 2018, now Pat. No. 10,390,191, which is a continuation of application No. 16/029,165, filed on Jul. 6, 2018, now Pat. No. 10,117,075, which is a continuation of application No. 15/669,598, filed on Aug. 4, 2017, now Pat. No. 10,117,074, which is a continuation of application No. 15/410,385, filed on Jan. 19, 2017, now Pat. No. 9,763,070, which is a continuation of application No. 15/044,739, filed on Feb. 16, 2016, now Pat. No. 9,584,464, which is a continuation of application No. 13/744,367, filed on Jan. 17, 2013, now Pat. No. 9,294,428.

(60) Provisional application No. 61/746,638, filed on Dec. 28, 2012, provisional application No. 61/680,949, filed on Aug. 8, 2012, provisional application No. 61/587,946, filed on Jan. 18, 2012.

(51) Int. Cl.

| | | |
|---|---|---|
| *H04L 67/306* | (2022.01) | |
| *H04L 69/329* | (2022.01) | |
| *H04M 1/724* | (2021.01) | |
| *H04W 4/02* | (2018.01) | |
| *H04W 4/12* | (2009.01) | |
| *H04W 4/21* | (2018.01) | |
| *H04W 12/02* | (2009.01) | |
| *H04W 12/30* | (2021.01) | |
| *H04L 9/40* | (2022.01) | |
| *H04L 51/222* | (2022.01) | |
| *H04L 51/58* | (2022.01) | |
| *H04W 12/63* | (2021.01) | |

(52) U.S. Cl.
CPC .......... *H04L 69/329* (2013.01); *H04M 1/724* (2021.01); *H04W 4/023* (2013.01); *H04W 4/12* (2013.01); *H04W 12/02* (2013.01); *H04W 12/30* (2021.01); *H04L 51/222* (2022.05); *H04L 51/58* (2022.05); *H04L 63/102* (2013.01); *H04W 12/63* (2021.01)

(58) Field of Classification Search
USPC .......... 709/206, 220, 224, 226, 228
See application file for complete search history.

(56) References Cited

U.S. PATENT DOCUMENTS

| | | | | |
|---|---|---|---|---|
| 7,071,842 | B1 | 7/2006 | Brady, Jr. | |
| 7,203,502 | B2 | 4/2007 | Wilson et al. | |
| 7,221,939 | B2 | 5/2007 | Ylitalo et al. | |
| 7,269,664 | B2* | 9/2007 | Hutsch | H04L 67/567 |
| | | | | 707/999.1 |
| 7,636,779 | B2 | 12/2009 | Hayashi et al. | |
| 7,764,946 | B1 | 7/2010 | Sennett et al. | |
| 7,890,581 | B2 | 2/2011 | Rao et al. | |
| 7,917,154 | B2 | 3/2011 | Fortescue et al. | |
| 7,958,081 | B2 | 6/2011 | Fitzpatrick et al. | |
| 8,059,169 | B2 | 11/2011 | Noh | |
| 8,069,168 | B2 | 11/2011 | Fitzpatrick et al. | |
| 8,069,169 | B2 | 11/2011 | Fitzpatrick et al. | |
| 8,073,461 | B2 | 12/2011 | Altman et al. | |
| 8,150,416 | B2 | 4/2012 | Ribaudo et al. | |
| 8,234,346 | B2 | 7/2012 | Rao et al. | |
| 8,407,220 | B2 | 3/2013 | Fitzpatrick et al. | |
| 8,447,510 | B2 | 5/2013 | Fitzpatrick et al. | |
| 8,533,857 | B2 | 9/2013 | Tuchman et al. | |
| 8,559,980 | B2* | 10/2013 | Pujol | H04W 4/023 |
| | | | | 455/457 |
| 8,566,192 | B2 | 10/2013 | De Mes et al. | |
| 8,676,668 | B2 | 3/2014 | Wolfe | |
| 8,688,148 | B2 | 4/2014 | Steenstra et al. | |
| 8,869,307 | B2 | 10/2014 | Broch et al. | |
| 8,965,992 | B2 | 2/2015 | Boudreau et al. | |
| 9,119,017 | B2 | 8/2015 | Sinha | |
| 9,141,961 | B2 | 9/2015 | Rajan et al. | |
| 9,178,994 | B2 | 11/2015 | Tuchman et al. | |
| 9,203,793 | B2 | 12/2015 | Kandekar et al. | |
| 9,210,528 | B2 | 12/2015 | Naqvi | |
| 9,231,904 | B2 | 1/2016 | Johnson et al. | |
| 9,251,506 | B2 | 2/2016 | Benjamin et al. | |
| 9,270,682 | B2 | 2/2016 | Boudreau et al. | |
| 9,288,226 | B2 | 3/2016 | Ben-Itzhak et al. | |
| 9,294,428 | B2 | 3/2016 | Nordstrom et al. | |
| 9,356,921 | B2 | 5/2016 | Kanov et al. | |
| 9,443,255 | B2 | 9/2016 | Steenstra et al. | |
| 9,571,565 | B2 | 2/2017 | Jimenez Arreola et al. | |
| 9,584,464 | B2 | 2/2017 | Nordstrom et al. | |
| 9,712,486 | B2 | 7/2017 | Johnson et al. | |
| 9,723,487 | B2 | 8/2017 | Ramalingam et al. | |
| 9,763,070 | B2 | 9/2017 | Nordstrom et al. | |
| 9,838,502 | B2 | 12/2017 | Croft | |
| 9,854,464 | B2 | 12/2017 | Lee et al. | |
| 9,978,042 | B2 | 5/2018 | Hull et al. | |
| 9,979,800 | B2 | 5/2018 | Berookhim et al. | |
| 9,986,414 | B1 | 5/2018 | Mangal et al. | |
| 10,117,074 | B2 | 10/2018 | Nordstrom et al. | |
| 10,117,075 | B1 | 10/2018 | Nordstrom et al. | |
| 10,171,599 | B2 | 1/2019 | Tiu, Jr. et al. | |
| 10,200,456 | B2 | 2/2019 | DeLuca | |
| 10,390,191 | B2 | 8/2019 | Nordstrom et al. | |
| 10,397,004 | B2 | 8/2019 | Leoutsarakos et al. | |
| 10,516,979 | B2* | 12/2019 | Nordstrom | H04W 12/30 |
| 10,990,619 | B1* | 4/2021 | Kuyda | G06F 16/31 |
| 11,005,955 | B2* | 5/2021 | Rosen | G06F 16/9537 |
| 2003/0200299 | A1* | 10/2003 | Jamison, III | H04L 9/40 |
| | | | | 709/223 |
| 2004/0203768 | A1 | 10/2004 | Ylitalo et al. | |
| 2005/0113123 | A1 | 5/2005 | Torvinen | |
| 2005/0181803 | A1 | 8/2005 | Weaver et al. | |
| 2005/0250552 | A1 | 11/2005 | Eagle et al. | |
| 2005/0282530 | A1 | 12/2005 | Raff | |
| 2006/0223518 | A1 | 10/2006 | Haney | |
| 2006/0238380 | A1 | 10/2006 | Kimchi et al. | |
| 2007/0030824 | A1 | 2/2007 | Ribaudo et al. | |
| 2007/0037574 | A1 | 2/2007 | Libov et al. | |
| 2007/0093258 | A1 | 4/2007 | Steenstra et al. | |
| 2007/0149208 | A1 | 6/2007 | Syrbe et al. | |
| 2007/0162569 | A1 | 7/2007 | Robinson et al. | |
| 2007/0282621 | A1 | 12/2007 | Altman et al. | |
| 2008/0030496 | A1 | 2/2008 | Lee et al. | |
| 2008/0039121 | A1 | 2/2008 | Muller et al. | |
| 2008/0062997 | A1* | 3/2008 | Nix | H04L 61/4511 |
| | | | | 370/395.2 |
| 2008/0070593 | A1 | 3/2008 | Altman et al. | |
| 2008/0195456 | A1 | 8/2008 | Fitzpatrick et al. | |
| 2008/0214204 | A1 | 9/2008 | Ramer et al. | |
| 2008/0215733 | A1 | 9/2008 | Paul et al. | |
| 2008/0267275 | A1* | 10/2008 | Li | H04B 1/7097 |
| | | | | 375/228 |
| 2009/0171937 | A1* | 7/2009 | Chen | H04L 51/04 |
| | | | | 707/999.005 |
| 2009/0271212 | A1* | 10/2009 | Savjani | G06Q 30/0207 |
| | | | | 705/14.1 |
| 2009/0300525 | A1 | 12/2009 | Jolliff et al. | |
| 2010/0070606 | A1 | 3/2010 | Shenfield et al. | |
| 2010/0205541 | A1 | 8/2010 | Rapaport et al. | |
| 2010/0291907 | A1 | 11/2010 | MacNaughtan et al. | |
| 2010/0305855 | A1 | 12/2010 | Dutton et al. | |
| 2011/0040603 | A1 | 2/2011 | Wolfe | |
| 2011/0099263 | A1* | 4/2011 | Patil | H04N 21/4755 |
| | | | | 709/224 |
| 2011/0167078 | A1 | 7/2011 | Benjamin et al. | |
| 2011/0207503 | A1 | 8/2011 | Ruperto | |

(56) References Cited

U.S. PATENT DOCUMENTS

| | | | |
|---|---|---|---|
| 2011/0219310 A1* | 9/2011 | Robson | G06Q 30/02 |
| | | | 715/733 |
| 2011/0225293 A1* | 9/2011 | Rathod | G06Q 10/10 |
| | | | 709/224 |
| 2011/0227699 A1 | 9/2011 | Seth et al. | |
| 2011/0238755 A1 | 9/2011 | Khan et al. | |
| 2011/0271212 A1* | 11/2011 | Jones | H04M 3/567 |
| | | | 715/753 |
| 2011/0320375 A1 | 12/2011 | Zrike et al. | |
| 2012/0030193 A1 | 2/2012 | Richberg et al. | |
| 2012/0066312 A1 | 3/2012 | Kandekar et al. | |
| 2012/0105475 A1 | 5/2012 | Tseng | |
| 2012/0209708 A1 | 8/2012 | Ramer et al. | |
| 2012/0209710 A1 | 8/2012 | Ramer et al. | |
| 2012/0215623 A1 | 8/2012 | Ramer et al. | |
| 2012/0239742 A1 | 9/2012 | Moradi et al. | |
| 2012/0253913 A1 | 10/2012 | Richard | |
| 2012/0265696 A1 | 10/2012 | Tuchman et al. | |
| 2012/0266258 A1 | 10/2012 | Tuchman et al. | |
| 2012/0271883 A1 | 10/2012 | Montoya et al. | |
| 2012/0290977 A1 | 11/2012 | Devecka | |
| 2013/0185368 A1 | 7/2013 | Nordstrom et al. | |
| 2015/0020106 A1* | 1/2015 | Belyaev | H04N 21/44226 |
| | | | 725/48 |
| 2015/0031096 A1* | 1/2015 | Damude | C12P 7/6427 |
| | | | 435/254.2 |
| 2015/0058324 A1 | 2/2015 | Kauwe | |
| 2015/0365725 A1* | 12/2015 | Belyaev | H04N 21/6175 |
| | | | 725/46 |
| 2015/0365726 A1* | 12/2015 | Benting | H04N 21/435 |
| | | | 725/34 |
| 2016/0065571 A1 | 3/2016 | Hoyos et al. | |
| 2016/0197993 A1 | 7/2016 | Perkowski et al. | |
| 2016/0328577 A1* | 11/2016 | Howley | G16H 20/60 |
| 2017/0103089 A1 | 4/2017 | Boyns et al. | |
| 2017/0272316 A1 | 9/2017 | Johnson et al. | |
| 2017/0308972 A1* | 10/2017 | Atkins | G06Q 30/0269 |
| 2017/0332220 A1 | 11/2017 | Nordstrom et al. | |
| 2018/0310159 A1 | 10/2018 | Katz et al. | |
| 2019/0075432 A1 | 3/2019 | Nordstrom et al. | |
| 2020/0265038 A1* | 8/2020 | Atkins | G06Q 50/14 |

FOREIGN PATENT DOCUMENTS

| | | | | |
|---|---|---|---|---|
| CN | 101401099 A | * | 4/2009 | ......... G06F 16/9038 |
| WO | 2010006062 | | 1/2010 | |
| WO | 2012035149 | | 3/2012 | |

OTHER PUBLICATIONS

Notice of Allowance in U.S. Appl. No. 15/410,385 dated May 4, 2017; 20 pages.

Non-Final Office Action in U.S. Appl. No. 15/669,598 dated Apr. 23, 2018; 13 pages.

Notice of Allowance in U.S. Appl. No. 15/669,598 dated Sep. 13, 2018; 15 pages.

Supplemental Notice of Allowance in U.S. Appl. No. 15/669,598 dated Oct. 23, 2018; 10 pages.

Supplemental Notice of Allowance in U.S. Appl. No. 15/669,598 dated Oct. 29, 2018; 9 pages.

Notice of Allowance in U.S. Appl. No. 16/029,165 dated Sep. 5, 2018; 19 pages.

Petition for Inter Partes Review of U.S. Pat. No. 10,117,075 and related filings and exhibits, publicly available under Case No. IPR2021-01014 at https://ptab.uspto.gov.

Non-Final Office Action in U.S. Appl. No. 13/744,367 dated Apr. 23, 2015; 23 pages.

Notice of Allowance in U.S. Appl. No. 13/744,367 dated Nov. 17, 2015; 28 pages.

Notice of Allowance in U.S. Appl. No. 15/044,739 dated Jul. 1, 2016; 19 pages.

Notice of Allowance in U.S. Appl. No. 15/044,739 dated Nov. 8, 2016; 9 pages.

Office Action in European Patent Application No. 13739124.9 dated Sep. 14, 2021; 23 pages.

Final Office Action in U.S. Appl. No. 16/041,179 dated May 16, 2019; 10 pages.

Miluzzo, et al., CenceMe—Injecting Sensing Presence into Social Networking Applications, EuroSSC 2007, LNCS 4793, pp. 1-28, 2007; 28 pages.

Petition for Inter Partes Review of U.S. Pat. No. 10,117,074 and related filings and exhibits, publicly available under Case No. IPR2021-00763 at https://ptab.uspto.gov.

Final Office Action in U.S. Appl. No. 16/673,099 dated Aug. 17, 2021; 9 pages.

Petition for Inter Partes Review of U.S. Pat. No. 10,516,979 and related filings and exhibits, publicly available under Case No. IPR2021-00764 at https://ptab.uspto.gov.

"Tinder (app)" Wikipedia, Sep. 5, 2021, accessed Mar. 8, 2022, https://en.wikipedia.org/wiki/Tinder_(app).

Petition for Inter Partes Review of U.S. Pat. No. 10,575,145 and related filings and exhibits, publicly available under Case No. IPR2021-00900 at https://ptab.uspto.gov.

Petition for Inter Partes Review of U.S. Pat. No. 9,294,428 and related filings and exhibits, publicly available under Case No. IPR2021-00765 at https://ptab.uspto.gov.

Petition for Inter Partes Review of U.S. Pat. No. 9,584,464 and related filings and exhibits, publicly available under Case No. IPR2021-00901 at https://ptab.uspto.gov.

Petition for Inter Partes Review of U.S. Pat. No. 9,763,070 and related filings and exhibits, publicly available under Case No. IPR2021-00766 at ptab.uspto.gov.

Pietilainen, et al., "MobiClique: Middleware for Mobile Social Networking", WOSN'09, Aug. 17, 2009, Barcelona, Spain; 6 pages.

Shakimov, et al., "Vis-a-Vis: Privacy-Preserving Online Social Networking via Virtual Individual Servers", IEEE 2011; 10 pages.

Wei, et al., "MobiShare: Flexible Privacy-Preserving Location Sharing in Mobile Online Social Networks", The College of William and Mary, 2012; 5 pages.

Non-Final Office Action in U.S. Appl. No. 16/041,179 dated Oct. 26, 2018; 9 pages.

Notice of Allowance in U.S. Appl. No. 16/041,179 dated Jun. 26, 2019; 10 pages.

Notice of Allowance in U.S. Appl. No. 16/178,766 dated Oct. 30, 2019; 14 pages.

Non-Final Office Action in U.S. Appl. No. 16/178,766 dated Jun. 13, 2019; 9 pages.

Notice of Allowance in U.S. Appl. No. 16/682,307 dated Jan. 8, 2020; 21 pages.

Office Action in European Patent Application No. 13739124.9 dated Jan. 17, 2017; 14 pages.

Office Action in European Patent Application No. 13739124.9 dated Oct. 18, 2019; 11 pages.

Office Action in European Patent Application No. 13739124.9 dated Oct. 20, 2017; 10 pages.

Office Action in European Patent Application No. 13739124.9 dated Feb. 13, 2019; 12 pages.

Office Action in European Patent Application No. 13739124.9 dated Jun. 1, 2018; 12 pages.

Office Action in European Patent Application No. 13739124.9 dated Jul. 31, 2020; 24 pages.

Extended Search Report in European Patent Application No. 13739124.9 dated Nov. 18, 2015; 12 pages.

International Preliminary Report on Patentability in counterpart international patent application No. PCT/US13/21997, dated Jul. 31, 2014; 9 pages.

International Search Report & Written Opinion in related international patent application No. PCT/US2013/021997, dated May 29, 2013; 12 pages.

* cited by examiner

SYSTEMS AND METHODS FOR ESTABLISHING COMMUNICATIONS BETWEEN MOBILE DEVICE USERS

RELATED APPLICATIONS

This application is a continuation application of U.S. patent application Ser. No. 16/673,099, entitled "Systems and Methods for Establishing Communications Between Mobile Device Users," filed on Nov. 4, 2019, which is a continuation application of U.S. patent application Ser. No. 16/178,766, filed Nov. 2, 2018, entitled "Systems and Methods for Establishing Communications Between Mobile Device Users" and issued as U.S. Pat. No. 10,516,979, which is a continuation application of U.S. patent application Ser. No. 16/041,179, filed Jul. 20, 2018 and issued as U.S. Pat. No. 10,390,191, entitled "Systems and Methods for Establishing Communications Between Mobile Device Users," which is a continuation application of U.S. patent application Ser. No. 16/029,165, filed Jul. 6, 2018 and issued as U.S. Pat. No. 10,117,075, entitled "Systems and Methods for Establishing Communications Between Mobile Device Users," which is a continuation application of U.S. patent application Ser. No. 15/669,598, filed Aug. 4, 2017 and issued as U.S. Pat. No. 10,117,074, entitled "Systems and Methods for Establishing Communications Between Mobile Device Users," which is a continuation application of U.S. patent application Ser. No. 15/410,385, filed Jan. 19, 2017 and issued as U.S. Pat. No. 9,763,070 on Sep. 12, 2017, entitled "Systems and Methods for Establishing Communications Between Mobile Device Users," which is a continuation application of U.S. patent application Ser. No. 15/044,739, filed Feb. 16, 2016 and issued as U.S. Pat. No. 9,584,464 on Feb. 28, 2017, entitled "Systems and Methods for Establishing Communications Between Mobile Device Users," which claims priority to U.S. patent application Ser. No. 13/744,367, filed Jan. 17, 2013 and issued as U.S. Pat. No. 9,294,428 on Mar. 22, 2016, entitled "Systems and Methods for Establishing Communications Between Mobile Device Users," which claims priority to U.S. Provisional Application Ser. No. 61/587,946, filed on Jan. 18, 2012 entitled "Geospatial-Based Detection System", U.S. Provisional Application Ser. No. 61/680,949, filed on Aug. 8, 2012, entitled "Collaboration Platform," and U.S. Provisional Application Ser. No. 61/746,638, filed on Dec. 28, 2012, entitled "Privacy Method for Social Networking Platforms," the entirety of each of which is incorporated by reference herein.

FIELD OF THE INVENTION

The inventive concepts relate generally to mobile device applications. More specifically, the inventive concepts relate to systems and methods that provide privacy and security for mobile device users and that remove barriers and inefficiencies with respect to electronic communications established with other mobile device users in a social networking or other collaborative environment.

BACKGROUND

Social and professional networking is a popular online activity and continues to grow, particularly on mobile devices. In order to perform online activities related to sharing information, users can register with a social networking service or the like, then enter personal or professional profile information at a mobile device such as a smartphone. The user can use search or location tracking features provided by the service to connect and engage in a communication with other mobile device users.

SUMMARY

In one aspect, provided is a method for establishing a communication between mobile device users. In the method, a plurality of mobile devices registers with a collaboration system. Each mobile device includes profile data. The collaboration system determines that a first registered mobile device and a second registered mobile device are at a same vicinity. The collaboration system determines a match between profile data of the first registered mobile device and profile data of the second registered mobile device. Displayed at the first registered mobile device in response to the match is a first list of user identifications. The first list includes an identification of a user of the second registered mobile device and an identification of a user of at least one other mobile device. Displayed at the second registered mobile device in response to the match is a second list of user identifications. The second list includes an identification of a user of the first registered mobile device and an identification of at least one other mobile device user.

In another aspect, provided is a method for establishing a communication between mobile devices. A plurality of mobile devices is registered with a collaboration system, each mobile device including profile data. The collaboration system processes the profile data of each registered mobile device. A user status is selected by each of a user of a first registered mobile device and a user of a second registered mobile device. The collaboration system determines that the users of the first and second registered mobile devices, respectively, selected a same user status. The collaboration system determines that the users of the first and second registered mobile devices, respectively, are within a predetermined geographic area with respect to each other. The collaboration system displays at the first registered mobile device a first list of user identifications, the first list including an identification of the user of the second registered mobile device. The collaboration system displays at the second registered mobile device a second list of user identifications, the second list including an identification of the user of the first registered mobile device.

In another aspect, provided is a method for remote or non-location based matching for providing user privacy or security. A plurality of mobile devices is registered with a collaboration system. Each mobile device includes profile data. The collaboration system determines that users of the first and second registered mobile devices, respectively, share a same user status. The collaboration system determines a match between profile data of the first registered mobile device and profile data of the second registered mobile device. Displayed at the first registered mobile device in response to the match is an alert that includes a first list of user identifications. The first list including an identification of a user of the second registered mobile device and an identification of a user of at least one other mobile device. Displayed at the second registered mobile device in response to the match is an alert that includes a second list of user identifications. The second list including an identification of a user of the first registered mobile device and an identification of at least one other mobile device user.

In another aspect, provided is a system for establishing a communication between a plurality of mobile devices, comprising: a processor that receives registration data from a plurality of mobile devices; a processor that determines first and second registered mobile devices have a common profile data element; a processor that determines a match between the first and second registered mobile device users based on the common profile data element; a processor that generates and outputs to the first registered mobile device in response to the match a first list of user identifications, the first list including an identification of a user of the second registered mobile device and an identification of a user of at least one other mobile device; and a processor that generates and outputs to the second registered mobile device in response to the match a second list of user identifications, the second list including an identification of a user of the first registered mobile device and an identification of at least one other mobile device user.

DETAILED DESCRIPTION OF THE EMBODIMENTS

Figure 1:
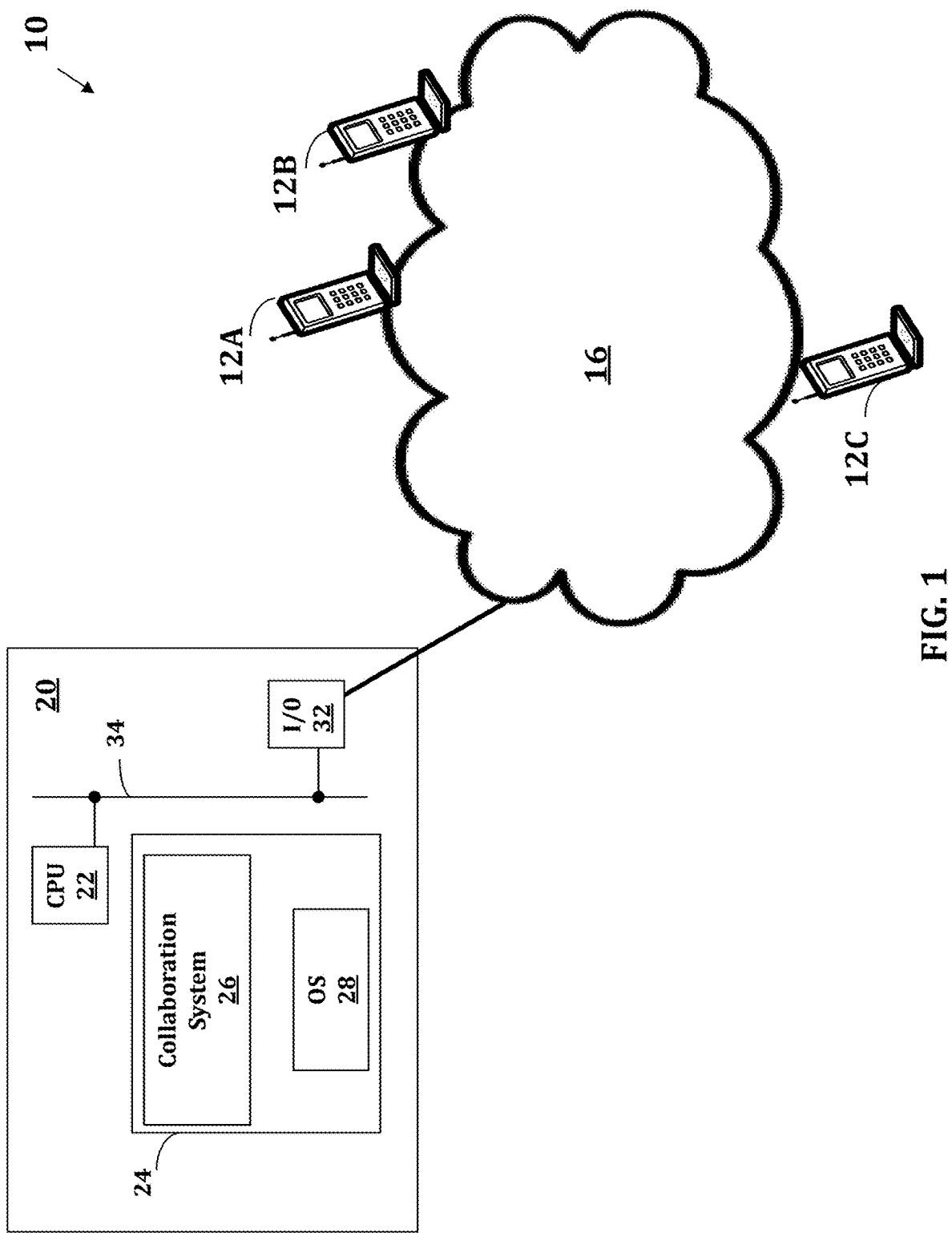
FIG. 1 is an illustration of an environment in which embodiments of the present inventive concepts can be practiced.

In the following description, specific details are set forth although it should be appreciated by one of ordinary skill that the systems and methods can be practiced without at least some of the details. In some instances, known features or processes are not described in detail so as not to obscure the present invention.

Privacy and safety concerns exist with respect to the online posting and sharing of personal and location information. For example, location-based social networking services now permit mobile device users to track the location of their friends and even strangers via their mobile devices.

Service providers providing location-tracking features may provide users some elements of control over their privacy settings. For example, service providers may permit users to expose their personal information only to a designated audience, for example, the user's friends and family, while restricting unauthorized parties such as strangers from viewing or otherwise accessing this information.

Traditional Web-based social and professional networking platforms are being made available for mobile device users to manage their personal profiles, contact lists, and related information. These platforms may also leverage the location tracking features available with modern smartphones, for example, informing a mobile device user about other users in the mobile device user's contact list who are in the same local area as the mobile device user. However, the user must provide a location-based networking platform with personal information, e.g., a contact list or social network and location tracking permissions, which can introduce privacy or safety concerns. For example, an unsuspecting user such as a minor may be in close proximity with a potentially hostile user, for example, a stranger, who may be provided by the networking platform with knowledge of the whereabouts of the unsuspecting user, which can provide an opportunity to physically interact with the unsuspecting user. In another example, a user's contact list may include an ex-boyfriend. However, the user may not wish the ex-boyfriend to use a location-tracking feature to know her whereabouts. In other cases, users may not want their contacts to know their whereabouts at certain times or in certain situations. Other users may desire the flexibility to select when, where and with whom they would like to present their personal information such as a current location.

One approach for protecting location privacy is to allow users to create private areas or 'hiding spots', where a user's presence at a particular location is hidden to others. However, this feature requires significant manual programming for each hiding spot location. Also, modifying these user settings to selectively permit other mobile device users to "see" the user at different times, in different locations, and across dynamic social situations, can be cumbersome.

Another approach provides the ability for a user to pre-configure a "circle of friends" designated to have knowledge of the user's location. However, a user's preferences for sharing a location with the circle of friends may vary depending on the location, the time of day, their status or current social situation, etc. It can become cumbersome to select and unselect users from a pre-configured circle of friends on a real-time basis.

Some location-based social networking environments publish the presence of mobile device users at a location, for example, on a map displayed on the mobile device screen, and provide features that permit a user to control who can see them, e.g., only direct contacts, so the user is not viewable among the broader list of users to any non direct contact user. However, these approaches are static, unidirectional, i.e., one user initiates, and do not protect the privacy of the other users in the area relative to that user, i.e., that user is concealed with respect to the other users, but the other users are still visible to that user and thus their privacy is not protected.

Also, the abovementioned approaches do not take into account "secondary contacts." Here, a "friend of a friend" or other indirect secondary contact may be in the same vicinity as a mobile device user. The abovementioned approaches can make the secondary contact and the mobile device users aware of each other's presence in the vicinity at the same time. However, neither party may be interested in communicating with the other ever, or just in that particular moment. As mentioned above, hiding spots or the like require significant manual operation and are limited with respect to providing privacy for both parties.

In brief overview, systems and methods in accordance with embodiments of the present inventive concepts assist users of smartphones or other mobile devices to detect friends and interesting people in a flexible and private manner, and remove conventional barriers and inefficiencies to interactions that may occur after two or more mobile device users are identified for a possible communication. In an embodiment, a roaming mobile device automatically scans a surrounding area for other mobile devices which meet predetermined search criteria established by the mobile device user, for example, other mobile devices determined to be in a same vicinity and/or that share a common interest, attribute, status, or profile. The roaming mobile device user can be presented with a list of names or identifiers of other mobile device users when a "match" is found, e.g., another mobile device user is identified as being in the same vicinity and/or determined to share a common interest, attribute, current status, and so on as the roaming mobile device. One of the identifiers on the list corresponds to the other mobile device identified in the match. The other identifiers can correspond to other mobile device users who may or may not have a relationship with the roaming mobile device user and/or may or may not actually be in the same vicinity but are determined to be "believable" to the viewer, i.e., the list is persuasive in that the user believes that the other mobile device users are indeed candidates for communication with the roaming mobile device user. Similarly, the discovered mobile device, i.e., the other device determined from the match, receives a list of names or other identifiers of other mobile device users, one of which is the name or identifier of the roaming mobile device. If the discovered mobile device user is selected from the roaming mobile device's list, and the roaming device user is selected from the discovered device's list, then the identity, location, status, and/or other personal information of each of the two parties, i.e., the roaming device user and the discovered device user, are revealed to each other, and a communication can be established between the two mobile devices. An important feature of the present inventive concepts is that anonymity is preserved unless both users mutually select each other, i.e., mutually "opt-in" to be connected. In particular, anonymity is preserved if one of the identified users of the match does not select the other identified user from the displayed list. Anonymity is also preserved if a first identified user selects a second identified user but the second identified user doesn't select the first identified user. In view of the displayed list including several possible users, a mobile device user doesn't know whether another user is actually in the vicinity or is otherwise available to communicate unless each user agrees to communicate with the other, or "opts-in". Thus, a map configured to display on a mobile device the locations of other mobile devices may not display the location, or exact location, and or identifying information of the other user unless the other user mutually selects the user of the mobile device displaying the map.

The systems and methods in accordance with embodiments include an automatic introduction tool providing geospatially active features that facilitate users to meet each other. Other applications can include but not be limited to general social interactions, for example, where two individuals are in the same vicinity and may be interested in being made aware of each other's availability in order to initiate a personal encounter such as a meeting. Related applications can include matchmaking services, where a mobile device user wishes to search for companions, for example, new friends, dates, exercise partners, travel companions, roommates, buyers or sellers for used goods, and so on. Regardless of the application, a list of possible dates, new friends, etc. are presented, at least one of which shares a common attribute, feature, or the like with the searching device, and the others being generated so that the viewer may believe that they are possible dates, new friends, etc.

Other applications can relate to business applications such as sales or marketing campaigns. For example, the name of a sales person determined to be in close physical proximity to a business owner can be displayed a business owner's mobile device among a list of other mobile device users, and vice versa. Accordingly, the business owner can opt whether to reveal his current location and/or status to the sales person. In another example, two mobile device users who indicate that each is interested in meeting for coffee can each receive a coupon offered by a coffee shop in the same vicinity as both users. As non-limiting examples, coupons may be presented as a single coupon or multiple coupons may be presented with an interface that allows the user the ability to browse, select from various categories, research the vendors, actively vote on their preferences with other connected user(s), etc. Although two users are described in a match, in other embodiments, more than two users, or groups of users, can be organized into a group. For example, a group of users can meet at a restaurant, and coupons can be presented to the group or groups of users who are in a same vicinity as the restaurant.

A feature of the systems and methods in accordance with embodiments is that a mobile device user is less likely to experience a sense of rejection by another user, which might otherwise occur when both mobile device users are fully aware of the other's actual presence or status and a mobile device user attempts to contact the other mobile device user but does not receive a response from the other mobile device user. For example, after being matched a first mobile device user may agree to reveal her identity and status to a second mobile device user by selecting a second mobile device user from a list of contacts presented at the first user's mobile device, but the second mobile device user may not be interested in communicating with the first mobile device user at a particular moment, even if the first mobile device user is a good friend or family member, and thus they may decide not to select the first user. In this case, neither matched users' identity and current location or status is revealed to the other and each user may receive a message from the system that a mutual opt-in did not occur. Accordingly, the systems and methods in accordance with an embodiment provide an environment where the first user can rationalize that the second user wasn't actually nearby or sharing a similar status, or was unavailable, and avoid a sense of rejection where the first user wants to chat with the second user, but not vice-versa. In one embodiment, a user may be limited to the number of users he or she may select on their device list. For example, if they are presented a list of five possible users who are the match, they may be limited to select only a maximum of four from their list. Thus, there would always be one user they were not able to select, even if they wanted to communicate with all the users on their list. If a mutual opt-in does not occur, the user may rationalize that the one user they were not able to select was the user with whom they were matched and thus they could avoid feeling a sense of rejection assuming it was the user who they didn't have the opportunity to select who was actually there.

FIG. 1 is an illustration of an environment 10 in which embodiments of the present inventive concepts can be practiced.

The environment 10 can include a social networking environment or related environment where a communication can occur between two or more electronic devices, in particular, mobile devices 12A, 12B, 12C (generally, 12). Such communications can include the exchange of messages, voice, video, and/or other data such as profile information or location coordinates, between two or more of the mobile devices 12 and/or a computer system 20 over a network 16. A service provider such as a social networking service can facilitate communications between electronic device users, for example, users at mobile devices 12. Other elements (not shown) of the environment 10 can include but not be limited to GPS, geotagging, electronic beacons, desktop or non-mobile computers, databases, cloud computing applications, and other network computing hardware and software components known to those of ordinary skill in the art.

The mobile devices 12 can include personal digital assistants (PDA) or smartphones, tablet devices, wireless computers, or other electronic devices having the ability to exchange data with the network 16. Each mobile device 12 can have a display screen, speaker, and/or other input/output (I/O) device for presenting text, graphics, voice, video, recorded messages, and/or other data exchanged in the environment 10, and for providing roaming features. The mobile devices 12 can have different configurations, for example, different display sizes, form factors, connection speeds, and/or other physical or electronic distinguishing features.

The participant mobile devices 12 can be geographically separate from each other, and can communicate with each other and/or the computer system 20 via the network 16, for example, a public switched telephone network (PSTN), a mobile communications network, a data network, such as a local area network (LAN) or wide area network (WAN), or a combination thereof, or other communication network known to those of ordinary skill in the art.

The computer system 20 can be part of, or in electronic communication with, an application server or related processing device (not shown) via the network 16, for example, a social networking server, or other non-mobile social networking platforms, such as a conventional on-line systems. The computer system 20 may be a stand-alone server and/or a cloud-based or scalable network-based platform. The computer system 20 can include one or more processors 22 such as a central processing unit (CPU), a memory 24, and an input/output (PO) logic 32, which can communicate with each other via a bus 34, for example, a peripheral component interconnect (PCI) bus. The I/O logic 32 can include a network interface card (NIC) or other adaptor for connecting the computer system 20 with the network 16.

The memory 24 can include volatile memory, for example, random access memory (RAM) and the like, and/or non-volatile memory, for example, read-only memory (ROM), flash memory, and the like. The memory 24 can include removable and/or non-removable storage media implemented in accordance with methods and technologies known to those of ordinary skill in the art for storing data. Stored in the memory 24 can include program code of an operating system (OS) 28 and a collaboration system 26 executed by one or more processors 22. The program code can carry out operations for aspects of the present inventive concepts. The program code may execute entirely on one or more computers, for example computer 20 and/or mobile devices 12, partly on the user's computer and/or mobile devices 12, as a stand-alone software package, partly on the user's device and partly on a remote computer or entirely on the remote computer or server. In the latter scenario, the remote computer may communicate with other elements of the environment 10 through any type of network, including the network 16.

The collaboration system 26 can employ hardware and/or program code stored in the memory 24 or other storage device, and is executed by a processor at the computer system 20. The collaboration system 26 can include, or otherwise establish a communication with a computer that includes, a network-based, geospatial search tool that can continuously or intermittently search for the presence and/or location of mobile devices 12 and/or detectable objects, such as a stationary business, for example, a restaurant. A location of a mobile device 12, or other objects, may be tracked using GPS, by triangulation or related techniques using mobile network towers, and/or with local antennas using other mobile devices 12 on the network. In the latter case, a mobile phone 12 on the network 16 can recognize the presence of another device, for example, via Bluetooth™, GPS, or other wireless technology, and then transmit the location information to the collaboration system 26. Other types of geospatial analysis can be equally performed. User positioning data, current and historical user locations or registered users, and/or other geospatial pattern history data, can be stored at the collaboration system 26 or other storage device in communication with the collaboration system 26, the mobile devices 12, and/or other elements of the environment 10.

The collaboration system 26 can process information, or profile data, related to the registered mobile devices 12. Profile data elements can include, but not be limited to, a mobile device user's status, e.g., hungry or bored, personal interests, direct and/or shared social relationships provided for example as contact data, associated attributes about the user, e.g. job title, desired search or scanning preferences such as a designated search radii about the mobile device, current or historical location data, and/or other relevant user information. Profile data can be derived from contact lists or other data sources stored locally at a mobile device 12, and/or be derived from external sources, such as personal profile data retrieved from an online social media account, a database, e-mail exchange, human resource data source, and/or other repository containing profile data that is accessible by the collaboration system 26 via the network 16. Profile data, registered user account information, device settings, preferences, and the like can be stored in a table format or the like at a data repository, for example, the memory 24 of the collaboration system, or other storage device in communication with the environment 10. The collaboration system 26 can process, and optionally store, other data related to mobile device communications such as current or past location information of the mobile devices 12, user usage statistics, and/or mobile device contact data which can be used in accordance with embodiments of the present inventive concepts.

The collaboration system 26 can compare the location data, profile data, search criteria, and/or other data related to a mobile device 12 to identify a common location, attribute, or other profile data shared by two or more mobile devices 12. The collaboration system 26 can generate a match result when a comparison produces profile data or related information that is common to different mobile device users 12. For example, a match result can be generated when the collaboration system 26 establishes that two mobile devices 12 are in a same city block and that the user of each mobile device 12 indicates as a status that he or she is hungry.

In another embodiment, group matching can occur between two or more mobile devices 12. This can include receiving, by each of the registered mobile devices 12, a notification of information related to at least one other of the registered mobile devices 12. A user of each of the two or more registered mobile devices 12 can select an identification of the at least one other of the two or more registered mobile devices. A direct communication can be established between registered mobile devices of the two or more registered mobile devices identified as being part of a common group of the at least one group. For example, a plurality of mobile device users can receive an alert of the presence, shared status, location, or other profile data regarding other registered mobile devices. Each can select from a list generated in accordance to a method described in accordance with an embodiment, for example, described herein. The collaboration system 26 can include a processor that identifies one or more compatible or common groups, for example, groups in which each person selects all other mobile devices in that group.

The collaboration system 26 can provide registered mobile devices 12 with a Simultaneous or near-simultaneous, multi-way opt-in feature when a match is determined between two or more devices. The collaboration system 26 can generate an alert, a notification, or the like, which is provided to each mobile device 12 identified in the match result. A user may establish different alerts for various matches received. For example, a user can set an audible alert when a close contact or friend is detected nearby and identified in a match. In another example, a user may set all non-close contacts in the mobile device contact list, e.g., a contact who is not a friend or immediate family member, to a silent mode and receive a silent alert such as a text message if a non-close contact is identified in a match. The alert, notification, or the like can include a list of other mobile device users, which includes the other mobile device 12 identified in the match result, and also includes identifiers of other people generated by the collaboration system 26 who may or may not be "real" people, i.e., fictitious names generated according to an algorithm, technique, or the like, and determined to be "believable." An example of a fictional "believable person" includes information such as a name or other identifier determined by the collaboration system 26 to be possibly recognized by the user as being a person that the user may know or be acquainted with, which is presented to the mobile device 12 as being in the same vicinity as the user, having a common interest, and so on, even though the "person" presented to the mobile device 12 is not in fact a real person. The algorithm, technique, or the like for generating user identifications for a list displayed in response to a match result can retrieve stored profile data of other users, and modify the profile data to maximize the 'believability' of the list. This feature of presenting a list of "believable users" to a mobile device 12 provides a level of privacy for the mobile device 12 by ensuring that a mobile device identified from the match result is not immediately aware of the other's full identity and/or actual location or status. In establishing a "believable" mobile device user for the list, the collaboration system 26 may employ any variety of techniques to selectively choose which user identifications are to be displayed in the list, so as to make 'believable' the presence of a potential user on a list. For example, if a user of the mobile device 12C is at an airport in another country, only other users who could actually be at that airport may be displayed to maximize the 'believability' of the profile options presented. Alternatively, users presented on a displayed list can include real and/or fictitious people, which can be generated by the collaboration system 26 from profile data of other registered mobile device users, or created randomly according to a name generator at the collaboration system 26 that optimizes the profiles presented to maximize the believability of the list.

The collaboration system 26 may assess numerous parameters from profile data of other registered mobile devices to identify a 'likely' or 'probable' list of mobile devices for the list. These parameters can include profile data such as the actual or probable location of the other mobile devices at the time of the match determination, device location traces in the past and the timing of the traces, user home and office locations, user interests, user profile and status information, e.g., information identifying a person with a baby who is near a day care center, user privacy settings, e.g., settings designating the area of interest as a user 'hiding spot', and/or historical information, e.g., a track record indicating that during the previous five days the user was at a particular location.

The collaboration system 26 can present other notification data in addition to matched users and lists. For example, the collaboration system 26 can assess user locations relative to stationary points of interest such as a restaurant. Here, the collaboration system 26 can notify a user that the restaurant is nearby. Accordingly, the collaboration system 26 can make a mobile device user aware of businesses, products, services, or other location-based objects that the user may be interested in, for example, being alerted that a Sushi restaurant is nearby. In this example, the user while walking down a sidewalk may receive an alert at the user's mobile device to a virtual geo-tagged coupon that has been "posted" in the vicinity of the Sushi restaurant. Geospatial information such as the presence and location of retail stores, restaurants, public transportation centers, and so on, can likewise be stored at the collaboration system 26 or other storage device in communication with the environment 10.

In another embodiment, the collaboration system 26 can remotely connect mobile device users, even when they are not in a same location. Here, an initiating user can provide the collaboration system 26 with profile data such as a current status, for example, indicating that the user is available for an electronic "chat," "game," or the like. The collaboration system 26 can identify other registered mobile devices having the same status, and are also determined to be available for an electronic chat, game, or the like. The system 26 can then generate an alert for the initiating user and one or more other identified users having the same status. The identities of the initiating user and another identifier user are only revealed to each other after each selects the other from a corresponding list of candidate users and mutually opts-in, or otherwise agrees, to chat or play a game.

Figure 2:
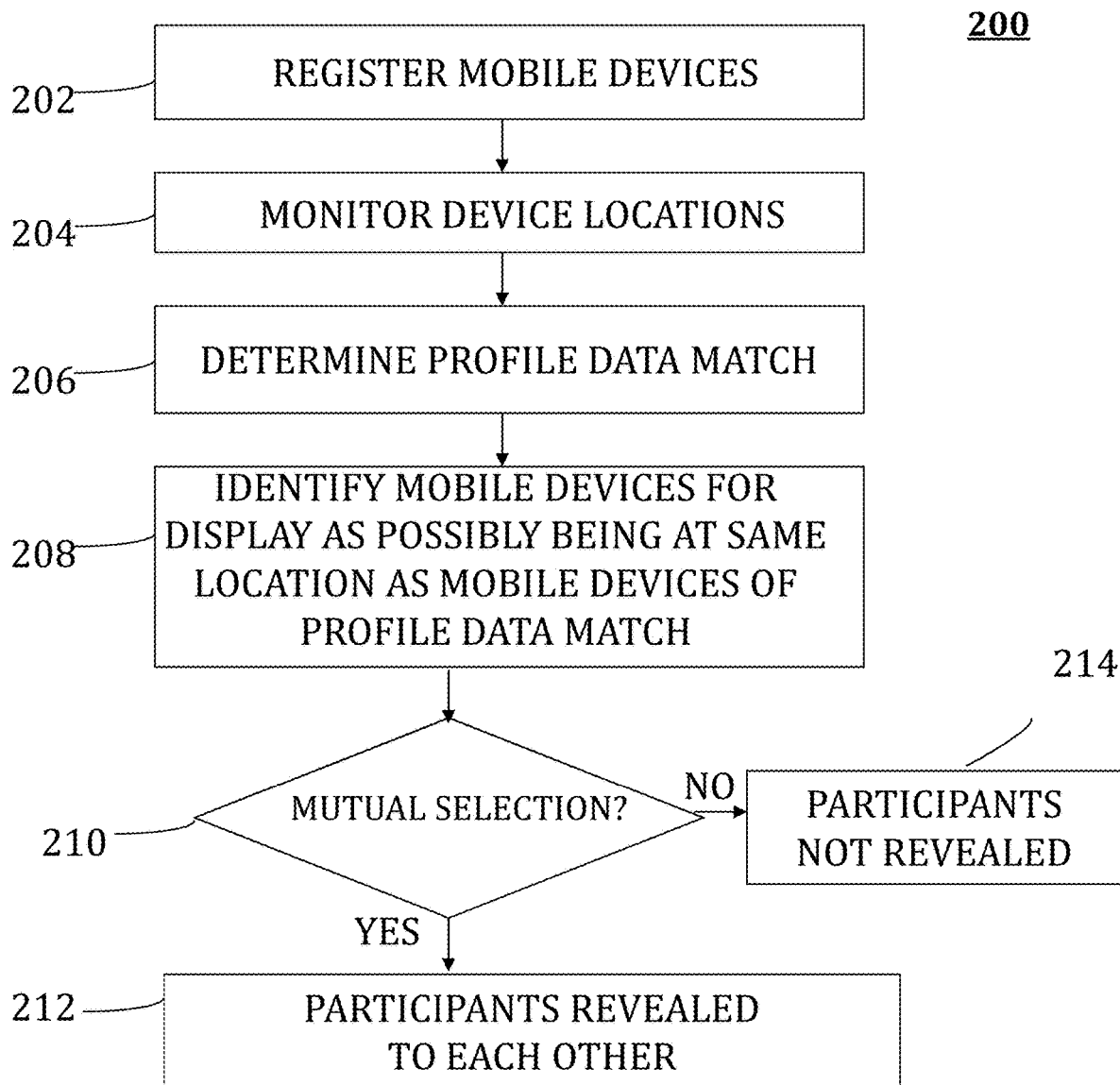
FIG. 2 is a flowchart illustrating a method of establishing a communication between mobile device users, in accordance with an embodiment.

FIG. 2 is a flowchart illustrating a method 200 of establishing a communication between mobile device users, in accordance with an embodiment. In describing the method 200, reference can be made to elements of FIG. 1. Some or all of the method 200 can be performed at the computer system 20, one or more intermediary devices (not shown but well-known to those of ordinary skill in the art such as servers, routers, and so on) at the network 16, and/or mobile devices 12 of FIG. 1, for example, governed by instructions that are stored in a memory of the computer system 20 and/or one or more mobile devices 12 and executed by one or more processors of the collaboration system 26 of the computer system 20 and/or one or more mobile devices 12.

At block 202, two or more mobile devices 12, for example, mobile devices 12A and 12B, register with the collaboration system 26. A mobile device 12 can register with the collaboration system 26 via a user interface displayed at the mobile device 12, or from another computer, or from a display directly attached to the collaboration system. As part of the registration process, a user of each mobile device 12A, 12B can establish an account on the system 26 and enter profile data, which can be processed by the collaboration system 26, for example, to perform an operation in accordance with an embodiment. As described herein, profile data can include user contact information or other social relationship data, user status information, for example, a status indicating that the user is currently hungry or bored and/or available for communication, personal details, associated attributes, and/or desired search criteria or scanning preferences, for example, a designated search radius of 1 mile from a current location of the mobile device 12. As described herein, profile data can include other location data, and/or other relevant configuration data, for example, permission to monitor a location of a mobile device 12 according to one or more localization and tracking methods known to those of ordinary skill in the art, for example, using GPS techniques. The profile data can be stored at a table or other data format on a storage device so that the profile data is associated with the user's established account data. In addition to personal profile data, a commercial user may provide the collaboration system 26 with information about a business such as its products, services, target customers, coupons, and so on. In this example, the business may be at a location frequently visited by a user. In another example, a mobile device user can submit preferences related to other people, places, or things, e.g., other mobile devices, that the system 26 is permitted to detect and the manner in which the user may be notified.

Scanning preferences, search criteria, and/or other configuration information can include information about whom or what local information the system 26 may detect and the manner in which the user is to be presented with a notification, for example, settings associated with what profile data is permitted to be displayed or visible to other mobile device users. For example, profile data for a mobile device 12A may be 'tiered' and only made available to other mobile devices 12 that meet certain criteria established by the user of the mobile device, e.g., buddy list contacts, those who are affiliated with the same business, etc. A tiered configuration may permit only a limited amount of information to be initially displayed at the other mobile device 12 user's list, for example, user name or handle only. If two parties select each other from a list, then additional profile information can be revealed, according to configuration parameters defined by each party. In another example, the configuration system 26 can be configured to permit some registered users having certain profile data in common with profile data of the mobile device user 12A to see some or all information related to the common profile data, while providing other registered users with limited information, for example, the user's screen name.

In a tiered configuration, initially the users may only see user picture icons on their respective lists. They may be able to select a user's photo and see limited information about them (e.g., "Tier 1" information) such as hometown, age, etc. If users mutually select each other from their respective lists, then they may see more information (e.g., "Tier 2" information) such as a university, an employer, hobbies, etc. After chatting in a chat window, if both parties are comfortable with each other, each may choose to 'release' profile information to allow the other to see it in its entirety (e.g., "Tier 3" information) such as name, e-mail address, friend list, etc.

In another example, a user can create a "public profile" and a "company/internal profile". Other users who work in the same company may view contents of the company/internal profile that can include confidential information. Other mobile device users in the same vicinity who are not authorized to view this information may only see the user's public profile, which includes non-confidential information.

A user of a registered mobile device 12 may provide inputs or instructions to the collaboration system 26 to assist the system 26 in identifying, screening, prioritizing, categorizing, or otherwise differentiating mobile devices 12, or local features or objects, which may be detected during a geospatial scanning and detection operation in accordance with an embodiment of the present inventive concepts, for example, during block 204 described below. One way that the system 26 can differentiate detected mobile devices 12 or local features or objects is to establish a prioritization or weighting to search attributes. This can be accomplished by a user individually ranking each search criteria, e.g., university attended or a hometown, according to a level of importance, for example, "High" or "Low". Another method in accordance with an embodiment can include the ranking of search criteria according to groupings, for example, assigning multiple search criteria to a "High Importance" or "Must Have" grouping, or to a "Low Importance" or "Nice to Have" grouping, to simplify the process of navigating through all the individual search criteria. As the user ranks each search criteria, the list of displayed criteria, as described herein, may behave 'dynamically' to further facilitate the ranking task. For example, the list may collapse as criteria are ranked or assigned, i.e., those ranked items are hidden, or those ranked may turn gray, or those ranked may move away from the master list and to a separate 'Ranked' list. Eventually the user may move some or all of the criteria from the first list to the second list that is used by the system as the active list that will be used to conduct searches. The collaboration system 26 can include a configurable search sensitivity meter, which can control the presentation of the number and/or frequency of other registered mobile devices that are detected, matched and presented to a user. For example, mobile device 12A profile data may include a scanning preference to monitor all mobile devices identified within a one-mile radius of the current location of the mobile device 12A. However, in some environments such as an urban setting or city, the collaboration system 26 may identify a large number of registered mobile devices 12. Since a typical mobile device display screen is incapable of efficiently displaying a large number of device names or identifiers, the collaboration system 26 can be configured to establish matching preference settings to control the volume, frequency, and/or quality of matches made by the system 26. The meter can include a governor or related control mechanism to control the frequency or volume of match result alerts that a mobile device 12 may receive. The governor or related control mechanism can be configured to accommodate a mobile device in an area with a substantial number of potential matches, for example, by modifying a setting for a "high quality match only" and only receive an alert if there is a high degree of match. Other settings can include a low setting, which can detect and/or display any mobile device within a predefined range, or a medium setting, which can prioritize the detection and/or display of discovered mobile devices with certain profile data search criteria that match search criteria established by the roaming mobile device. Other settings can include a high setting, which detects and/or alerts the user if an ideal user that matches all search criteria is in the range of the roaming mobile device. Other settings may include a "snooze" button that provides a user the ability to temporarily block alerts according to predetermined preferences such as for a period of time, or until they change locations, etc. Thus, in high-density user areas where a user is receiving too many matching alerts, the system 26 can be configured to provide a pause in order to limit or suspend alerts.

Alternatively, a user may choose to allow for random alerts, for example, provided as notifications to the roaming mobile device when another mobile device satisfying some, none, or all of the predefined search criteria is in the same vicinity as the roaming mobile device. The user of the roaming mobile device may enter or select various manual or custom search criteria that will be used by the system 26 to search for other mobile devices or objects, features, etc. These search criteria may be populated and saved at the computer system 20. During an operation, a mobile device user can enter search criteria in a text box or the like, select from pre-defined search criteria, execute various other pre-defined search algorithms to identify 'mutual matches', i.e., which identify registered user(s) with whom the roaming device user shares common attributes, features, and so on. Another feature can include 'reverse matches', i.e., which identifies registered users who are looking for the user's mobile device.

At block 204, the collaboration system 26 monitors, tracks, or otherwise determines the locations of the registered mobile devices 12, for example, using GPS, Wi-Fi, cell towers, or any other local or regional wireless network, or related location tracking technologies to determine the movement and locations of the mobile device 12. Current and historical location data can be stored at the collaboration system 26 and/or at a separate data storage device in communication with the collaboration system 26.

A registered user can establish a distance setting as search criteria, which can be stored and processed at the collaboration system 26. For example, the collaboration system 26 can be configured to monitor a location of the mobile device 12A, and to scan the current location of the mobile device 12A for other mobile devices 12 that are within a 100 feet from the mobile device 12A.

A registered mobile device user can submit several different profiles to the collaboration system 26, and activate a preferred profile for the system 26 to use when searching for other mobile devices. For example, the user may establish a weekday profile and a weekend profile with differentiated information. The user may manually activate the weekend profile on a Friday night. Alternately, the system 26 may automatically activate the weekend profile if an automatic alarm setting has been established for each profile. Here, the activated profile can be compared to the profile data of mobile devices detected during the search. The user can provide additional inputs or instruction to assist the system 26 in identifying, screening, prioritizing, categorizing, or otherwise differentiating registered mobile devices, or local features or objects, that it may detect. One or more geospatial scanning and detection techniques known to those of ordinary skill in the art can be performed when searching for the presence of other mobile devices and/or detectable objects such as restaurants or other stationary businesses.

At block 206, a profile data match is determined between two or more registered mobile devices 12. The profile data match can be determined in response to a geospatial scanning operation, for example, described herein. The collaboration system 26 can determine a profile data match from a comparison between profile data corresponding to the mobile device 12A and profile data of the mobile device 12B. In determining a match, the collaboration system 26 may apply one or more techniques, methods, algorithms, and the like to match attributes and/or search terms of a user's profile data with profile data of other mobile device users. For example, a determination can be made that mobile devices 12A and 12B have at least one attribute, interest, status, or other profile data or information in common. For example, a profile data match may occur when the collaboration system 26 establishes that the users of the mobile devices 12A, 12B, respectively, are each hungry, which can be achieved by the users selecting a status at the mobile devices 12A, 12B, respectively, that he or she is hungry, and/or establishes that the users have a mutual friend, and/or are each at or near a same restaurant.

In another example, the collaboration system 26 may generate a match result in response to a determination that mobile device users 12A and 12B are both at a same shopping mall, and that the profile data of mobile device 12A includes information indicating that mobile device user 12A is interested in martial arts, and that mobile device user 12B is also interested in martial arts. In one example, mobile device users 12A and 12B can have a known relationship. The strength of a relationship can be established by a predetermined "degree of separation" with respect to each other. The term "degrees of separation" derives from a well-known social networking concept that each person is a predetermined number of relationships from any other person, typically anywhere from one to six relationships. A lesser degree of separation, i.e., a smaller number of relationships, indicates a stronger relationship. On the other hand, a greater degree of separation, i.e., a larger number of relationships, indicates a weaker relationship. The collaboration system 26 can be configured to generate match results in response to a predetermined strength of the relationship, for example, no more than two degrees of separation. For example, if mobile device users 12A and 12B are former college roommates, there is a direct relationship, or first degree of separation, between them. In another example, if mobile device user 12A is a "friend of a friend" of mobile device user 12B, there is an indirect relationship, more specifically, a second degree of separation, i.e., a difference of two relationships, and so on. In other embodiments, the degree of separation is not considered, or is greater than a predetermined number of relationships, for example, greater than a fourth degree of separation. Thus, mobile device user 12A and 12B can be strangers to each other, but can nevertheless be candidates for a possible match. A display or graphical representation of the relationship, referred to as a social graph, may be presented during a "tiered" information release to each user to allow them to make a more accurate determination of whether or not they would mutually benefit from communicating with each other.

Profile matching can be performed automatically or continuously, for example, without a specific request made by a mobile device. Alternatively, profile match requests can be initiated by the user. For example, a mobile device user may be hungry, and activate the collaboration system 26 to locate friends or strangers who are in close physical proximity to the requesting user, and have profile data indicating that they are likewise hungry.

At block 208, one or more mobile devices 12 are identified for display at each mobile device 12A, 12B when a match is established between two or more mobile devices 12. The first mobile device 12A can be presented with a plurality of user profiles, or list, representing individuals who may possibly be in the same vicinity as the first mobile device 12A at a particular moment. One of the identifiers on the presented list refers to the user of the mobile device 12B, which is determined from the profile data match result. One or more identifiers on the presented list may actually not have the same status. Instead, these identifiers are of people who have some probability of having the same status or could be believable by the user of the first mobile device 12A to have the same status. The list can include random people from the mobile device user's contact list or friend network, or can include registered users identified from a 2-hop network, or strangers from an H-hop network, where H>2. The H-hop network can be modelled according to degrees of separation described herein. The identifiers on a list may correspond to people who are not actually at the same location as the mobile device displaying the list. Instead, these names may be of people who have some probability of being present at the same location or could be believable by the user of the first mobile device 12A to be at the same location. Similarly, a second set of mobile devices is displayed at the second mobile device 12B as possibly being at the same location as the first mobile device 12A. One of the candidate users is the user of the mobile device 12A, which is likewise determined from the profile data match result. If multiple mobile device users are in the same vicinity as the first mobile device 12A, and multiple mutual matches are possible, for example, several users are identified from the profile data match result, then the system 26 may display some or all of the identified users.

Each mobile device user 12A, 12B has the option of selecting who they may be open to meeting at that location at that time. Each selection made by the users of the first and second mobile devices 12A, 12B, respectively, can be stored at a table or the like at the memory 24 of the computer system 20. The collaboration system 26 can compare the selections made by the mobile device users to identify a mutual selection.

Accordingly, at decision diamond 210, a determination is made whether the mobile devices 12A, 12B select each other. If yes, then the method 200 proceeds to block 212, where each mobile device user 12A, 12B is made aware of each other's identity and location. Here, the collaboration system 26 may transmit a message or signal to either or both mobile devices 12A, 12B informing them of each other's presence, profile attributes, or other information. In this manner, the identities, locations, and/or other profile data of the mobile device users are revealed to each other only if the first mobile device user selects the second user's identifier from the list displayed at the first mobile device 12A and the second mobile device user selects the first user's identifier from the list displayed at the second mobile device 12B. Otherwise, the method 200 proceeds to block 214, where the abovementioned profile data, i.e., identity, location, and so on, of the mobile devices 12A, 12B are not revealed to each other.

In this manner, each mobile device user has the ability to decide if he or she wishes to reveal his or her identity, presence and/or status to none, several, or all of the individuals on their respective lists. The collaboration system 26 can be configured to prevent a user from selecting all the users presented at the user's mobile device 12 to reduce the risk of rejection. For example, if the first mobile device 12A is presented with a list having five names, but the first mobile device user is only permitted to select a maximum of four names, and no match is returned indicating that none of the users on the list selected the first mobile device user, the first mobile device user may assume that the fifth name was actually at the location but that no match occurred because the first user did not have an opportunity to select all including the fifth name.

If both parties to a match, e.g., the users of mobile devices 12A and 12B choose to establish a communication, or "opt-in", they can be revealed to each other, for example, each receiving a notification. In doing so, each mobile device 12A, B can receive a displayed option to communicate with the other via a phone call, instant message (IM), short message service (SMS) text message, email, or other form of communication known to those of ordinary skill in the art. A notification can include a communication window displayed at each mobile device 12A, 12B for providing the direct communication, the direct communication including at least one of an instant message (IM), a short message service (SMS), a phone call, or an electronic mail (email) message.

Figure 3:
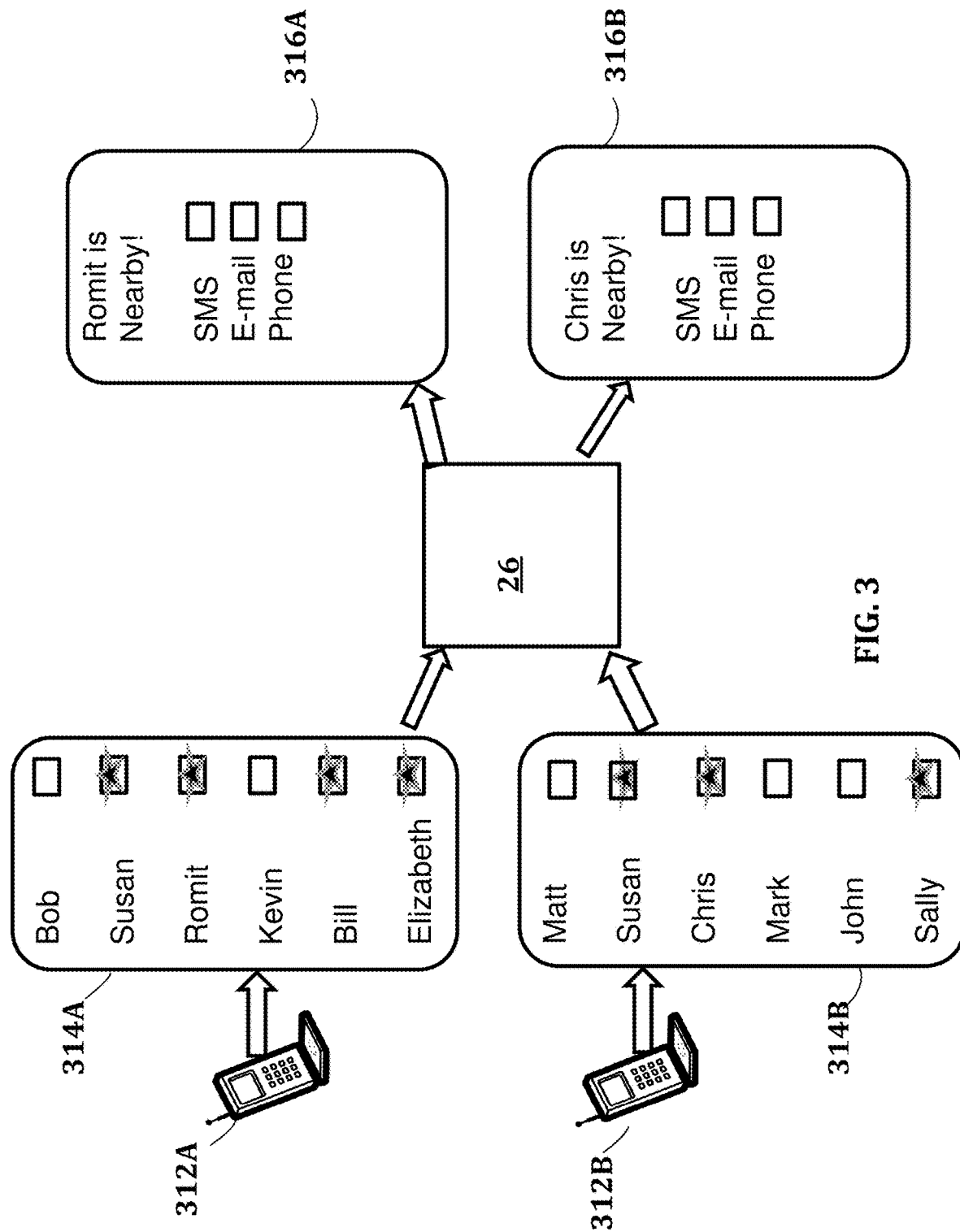
FIG. 3 is a diagram illustrating the establishment of a communication between two mobile devices, in accordance with an embodiment.

FIG. 3 is a diagram illustrating the establishment of a bi-directional communication between two mobile devices, in accordance with an embodiment. In describing FIG. 3, reference is made to elements of FIGS. 1 and 2. In FIG. 3, the mobile devices are smartphones. However, other electronic devices can equally apply.

A first smartphone 312A and a second smartphone 312B are each registered with the collaboration system 26. The collaboration system includes profile data for each smartphone 312A, 312B, including interests, current and historical location data, contact lists, search criteria, and so on. The profile data can be manually or automatically entered into the collaboration system 26, for example, by users of the smartphones 312A, 312B, respectively. Alternatively, or in addition, the profile data can be automatically retrieved by the collaboration system 26 from the smartphones 312A, 312B and/or other information sources, for example, a social networking service subscribed to by users of the smartphones 312A, 312B. The collaboration system 26 can be configured to monitor a location of each smartphone 312A, 312B, and store the location data along with other profile data. Accordingly, the collaboration system 26 in concert with a mobile network can scan a geographic area for other mobile devices, area businesses, local information, and so on based on established search preferences or other rules provided by users of the first and/or second smartphones 312A, 312B to determine when the smartphones 312A, 312B are at a same or nearby location or vicinity.

The collaboration system 26 can determine that the first smartphone 312A is at a same location as the second smartphone 312B, for example, a same shopping mall. For example, a first user of the first smartphone 312A can include profile data and search criteria indicating that the first user is interested in establishing communications with other registered users within 1 mile of the first smartphone 312A. The collaboration system 26 can also, or alternatively, determine from the profile data of each of the users of the smartphones 312A, 312B that the users have a common interest, for example, sports, and can further determine that the shopping mall includes an athletic department.

The collaboration system 26 can generate a match result from this data. For example, the collaboration system 26 can generate a match result in response to a determination that the second smartphone 312B is within 1 mile of the first smartphone 312A. The match result can include a list 314A of mobile device users that is displayed at the first smartphone 312A and a list 314B of mobile device users that is displayed at the second smartphone 312B. The first list 314A includes the name or other identifier of the user of the second smartphone 312B, i.e., "Romit." The second list 314B includes the name or other identifier of the user of the first smartphone 312A, i.e., "Chris." The lists 314A, 314B may be presented and managed in any variety of user interfaces, such as check boxes, or a feature where the user moves selected list items to a 'yes' bin, and moves rejected list items to a garbage can icon.

In an embodiment, either or both lists 314A, 314B is generated by an interactive physical means such as a user "shaking" a mobile device, for example, similar to rolling physical dice in a game. The collaboration system 26 can respond to the accelerometer (not shown) in an electronic device such as a smartphone. If a user wants to see who is out there that might want coffee, or just if they have any contacts around, the user can activate the system matching process described herein by physically shaking their phone like a pair of dice. The mobile device 12 being shaken can include sensors or the like to detect the rapid movement, or shaking, of the device 12, which can activate a processor at the collaboration system 26 to generate a list, which can include contacts, random users, system-created users, or a combination thereof.

A mutual acceptance or opt-in can occur when the user of the first smartphone 312A selects the second smartphone identifier, i.e., "Romit", on the first list 314A and the user of the second smartphone 312B selects the first smartphone identifier, i.e., "Chris", on the second list 314B. Here, each smartphone 314A, 314B is alerted (notification) that the other is actually in the local area and/or shares a similar status, for example, by a notification message 316A, 316B generated by the collaboration system 26. Thus, privacy can be provided in the form of an anonymous alert that is followed by a two way, mutual 'opt-in' feature. After each smartphone user agrees to opt-in, other information can be displayed on the mobile devices 312A, 312B, such as location-based or non-location based marketing information, for example, coupons to a store that is determined by the collaboration system 26 to be in the same vicinity as the smartphones 314A, 314B and matching the interests, status or other profile attributes of the two users. Additional details regarding this feature are described herein.

Figure 4:
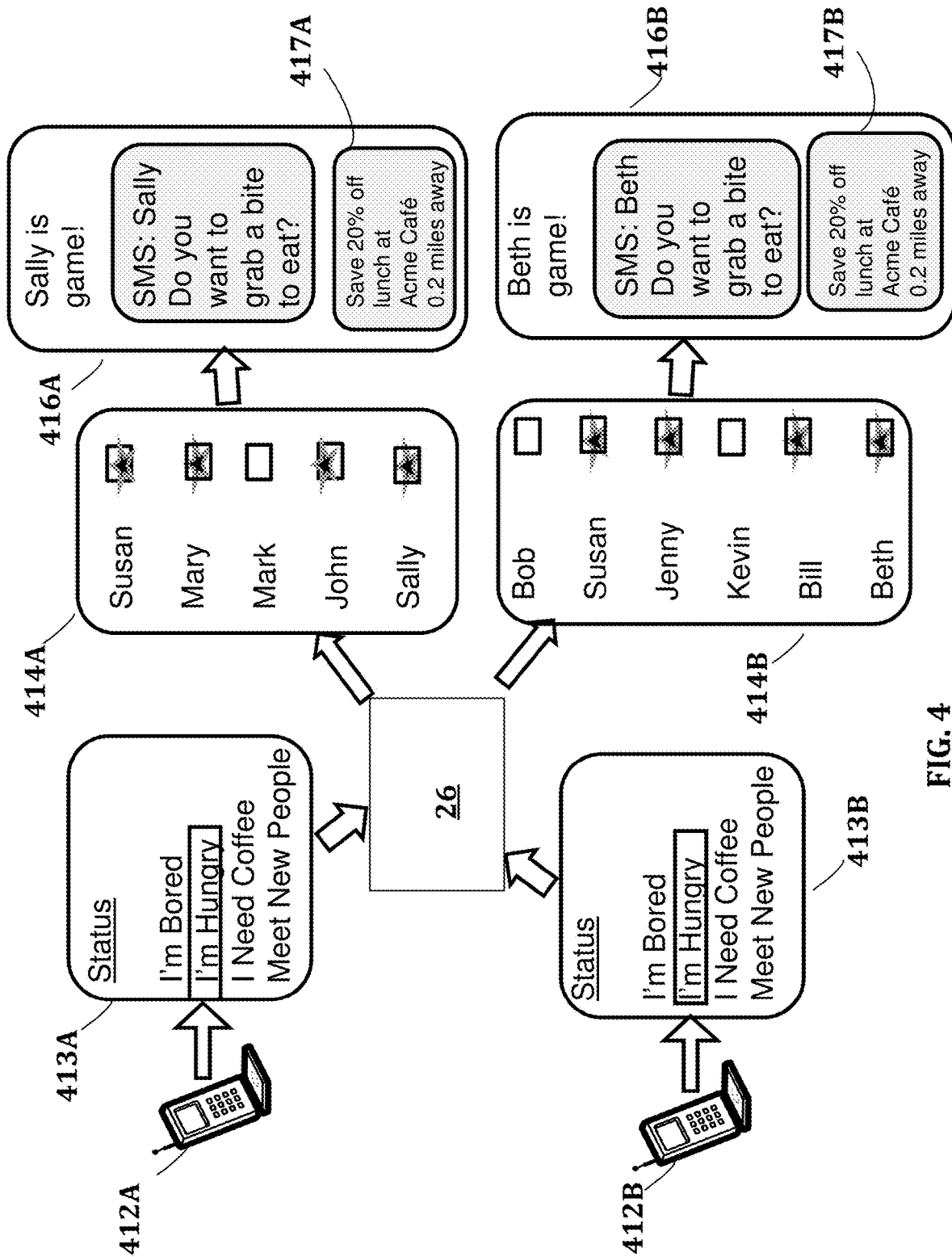
FIG. 4 is a diagram illustrating the establishment of a communication between two mobile devices, in accordance with an embodiment.

FIG. 4 is a diagram illustrating the establishment of a communication between two mobile devices, in accordance with an embodiment. In describing FIG. 4, reference is made to elements of FIGS. 1-3. In FIG. 3, the mobile devices are smartphones. However, other electronic devices can equally apply.

A first smartphone 412A and a second smartphone 412B are each registered with the collaboration system 26 in a manner similar to smartphones 312A, 312B of FIG. 3.

Each smartphone 412A, 412B registered with the collaboration system 26 can be presented with a search filter in the form of a status display 413A, 413B, respectively. The status displays 413A, 413B can include a list of a variety of status options such as "I'm Hungry", "I want to see a movie", "I want coffee", "I want to play a game," and so on. As shown in FIG. 4, the user of the first smartphone 412A selects the "I'm Hungry" status option at the smartphone display 413A. The user of the second smartphone 412B also selects the "I'm Hungry" status option at the smartphone display 413B. The collaboration system 26 can process the status option selection data and update the profile data of each smartphone 412A, 412B accordingly.

The collaboration system 26 can generate a match result from this data. For example, the collaboration system 26 can generate a match result in response to a first determination that the first and second smartphones 412A, 412B are in the same vicinity or predetermined distance from each other, for example, within 1 mile of each other, and further in response to a second determination that the users of the first and second smartphones 412A, 412B, respectively, share a same status, e.g., both users are hungry as indicated by the selections made at the displays 413A, 414B, respectively.

The collaboration system 26 can include a search timer. Accordingly, when a user wants to filter users in the same vicinity, which share a same status, the search timer can be activated, and a predetermined threshold can be established, for example, a user-defined number of minutes. Thus, if a match doesn't occur during this time, the system 26 stops looking for matches.

A list 414A of friends and/or other registered mobile device users who are potentially in the area and are also hungry can be displayed at the first smartphone 412A. This status, i.e. a hungry friend, is provided as profile data of the other registered mobile devices to the collaboration system 26. Similarly, a list 414B of potentially hungry friends and/or other registered mobile device users potentially in the area can be displayed at the second smartphone 412B. The first list 414A includes an identifier corresponding to the user of the second smartphone 412B, for example, the second smartphone user's contact name "Sally." The second list 414B includes an identifier corresponding to the first smartphone 412A, for example, the first smartphone user's contact name "Elizabeth" or "Beth."

The lists 414A, 414B can include identifiers, such as names, of other mobile device users identified in a match result, and can also include other mobile devices who may or may not be at the same location as the user and/or may or may not share a same status, but are nevertheless generated for the lists 414A, 414B, respectively, by the collaboration system 26 from mobile device profile data corresponding to the other mobile devices. For example, the name "Mark" on list 414A can be generated by a random name generator at the collaboration system 26, or according to an algorithm that establishes that the user of the mobile device 412A has a contact list that includes several different contacts having the name "Mark," and therefore, the user is likely to believe that "Mark" is at the same location and/or shares a same status. As another example, the system 26 may record and store which identifiers have previously been displayed on a user's list. If an identifier is a candidate for display based on a match, but that identifier has recently been displayed on that user's list, the system 26 may restrict displaying that identifier to that user to protect privacy. For example, if Bob works at a hospital and Jim has recently been included on multiple identifier lists displayed to Bob then Bob may infer that Jim is actually in the vicinity routinely and may be receiving a treatment. If the system 26 restricts the display of Jim's identifier to a reduced or intermittent frequency, Jim's privacy may be enhanced, as he would not be regularly visible to Bob at the hospital.

A mutual acceptance or opt-in can occur when the first smartphone user selects the second smartphone user's name, i.e., selects "Sally" on the first list 414A and the second smartphone user selects the first smartphone user's name, i.e., selects "Beth" on the second list 414B. Here, each smartphone 414A, 414B receives an alert, notification, or the like that the other is actually in the local area and that each is hungry as indicated by the selection made at the status displays 413A, 414B, respectively. For example, as shown in FIG. 4, when each of Elizabeth and Sally selects each other from the lists 414A, 414B, respectively, a notification is displayed on Elizabeth's invite screen 416A, indicating the Sally is interested in having lunch with Elizabeth. Similarly, a notification is displayed on Sally's invite screen 416B that Elizabeth is interested in having lunch with Sally.

After an opt-in match occurs, the interface that reveals the users' identify may display other information such as location-based or non-location based marketing information. For example, each invite screen 416A, 416B can display a coupon 417A, 417B offering a 20% discount to a local restaurant. Other features such as store directions, maps, pre-purchase screens, coupon redemption barcodes, etc. can be presented at the invite screen 416A, 416B. In one embodiment, a single coupon is displayed. In another embodiment, a plurality of coupons may be displayed to the users. They may be arranged in a list or a graphical or interactive display that allows the users to browse through the available options such as flipping through a deck of cards. The coupons may further be organized into groupings, such as coupons to coffee shops, restaurants, etc. In one embodiment, users may have the ability to vote or select coupons of interest and the system may then generate and display a tally or ranking to each user in order to communicate each other's preferences for the purpose of selecting the most popular discount or venue.

Figure 5:
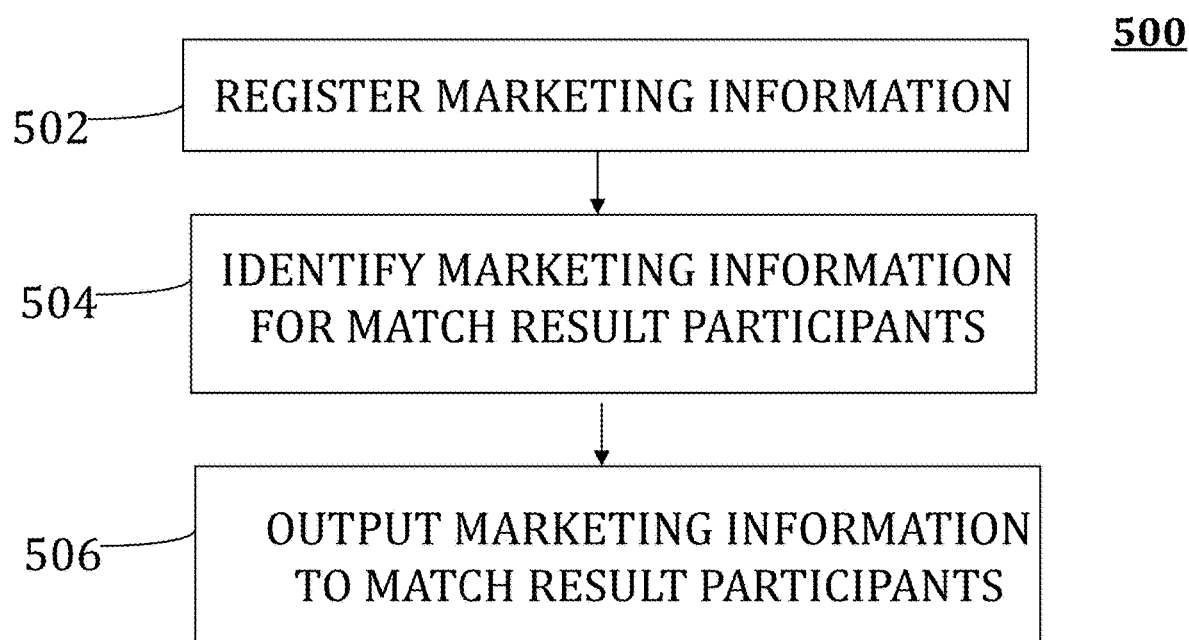
FIG. 5 is a flowchart illustrating a method of coupon offering in response to a location-based match, in accordance with an embodiment.

FIG. 5 is a flowchart illustrating a method 500 of coupon offering in response to a location-based match, in accordance with an embodiment. In describing the method 500, reference can be made to elements of FIGS. 1-4. Some or all of the method 500 can be performed at the computer system 20 and/or one or more intermediary devices (not shown) at the network 16 of FIG. 1, for example, governed by instructions that are stored in the memory 24 of the computer system 20 and executed by one or more processors 22 of the collaboration system 26 of the computer system 20 and/or one or more mobile devices 12. Some or all of the method 500 can be performed at one or more mobile devices described herein, for example, a processor and memory of a mobile device 12 of FIG. 1.

At block 502, marketing information is registered at the collaboration system 26. For example, a business may establish an account, post a coupon, and/or designate information associated with the coupon such as target customer demographics, eligible locations, or eligible timeframes before expiration of the coupon, etc. The marketing information can be stored at the computer system 20, for example, at memory 24, or at a remote storage location in communication with the collaboration system 26.

At block 504, registered marketing information is identified that may be of interest to mobile device users identified in a profile data match result, and selected in response to an "opt-in" as described herein. For example, the collaboration system 26 may assess from mobile device profile data the current location and interests of each mobile device user and identify that they both drink coffee. The system 26 can identify registered marketing information, e.g., coupons posted by coffee shops at or near the location, which may be of particular interest to one or both users.

At block 506, the collaboration system 26 can transmit the marketing information identified at block 504 to the mobile devices identified in the match result. One or both mobile device users can browse, select, rank or vote, and/or accept the marketing information, for example, by selecting a redeem button for a coupon displayed at a mobile device. The user selections can be transmitted to the collaboration system 26 and added to the profile data corresponding to the mobile devices. Other information can be displayed at the mobile devices, such as directions to the coffee shop offering the coupon, or other marketing messages including location-based and non-location based specials, coupons, advertisements, etc. and the ability for users to select and redeem them as part of a matching event. Information about users' historical coupon selections or purchases may be stored and/or displayed at each respective user's device and/or in aggregate such as a display of user "points" earned to date at a business for previous patronage, aggregated user ratings to businesses, and the like.

In another illustrative example of an application in accordance with an embodiment, a coupon can be provided for users in a location, such as residents of a building, which offers discounts for a nearby restaurant if a predetermined number of people from the building arrive for dinner that night. The system 26 can display at the residents' mobile devices lists of people who may currently be near the building and potentially open to dinner. A mobile device user, i.e., a resident, can select friends displayed on the list who may be in the vicinity and willing to go to dinner. The system can identify if there is a set of K or more users all of which form a clique or other group (i.e., each of the users has picked all the (K−1) users). Here, the system 26 can notify each user about this opportunity, and the K user may together redeem the coupon. A commission or other incentive may be earned by a provider for coordinating these people to visit the restaurant.

Related examples can include coordinating people in airports to share a cab to their homes, coordinating among tourists who are visiting places they are unfamiliar with, coordinating among people who intend to perform an activity together. In all these cases, the coordination can be privacy preserving, and supported by mutual opt-in procedures. This feature thus permits value-sharing opportunities with meet-up venues and retailers. For example, by facilitating a grouping of strangers to share a tour bus while on vacation, the tour bus operator may benefit by securing more customers, the customers may benefit by receiving a group discount, and the described collaboration platform may benefit by receiving a commission for organizing this group of tourists in a real-time manner.

Figure 6:
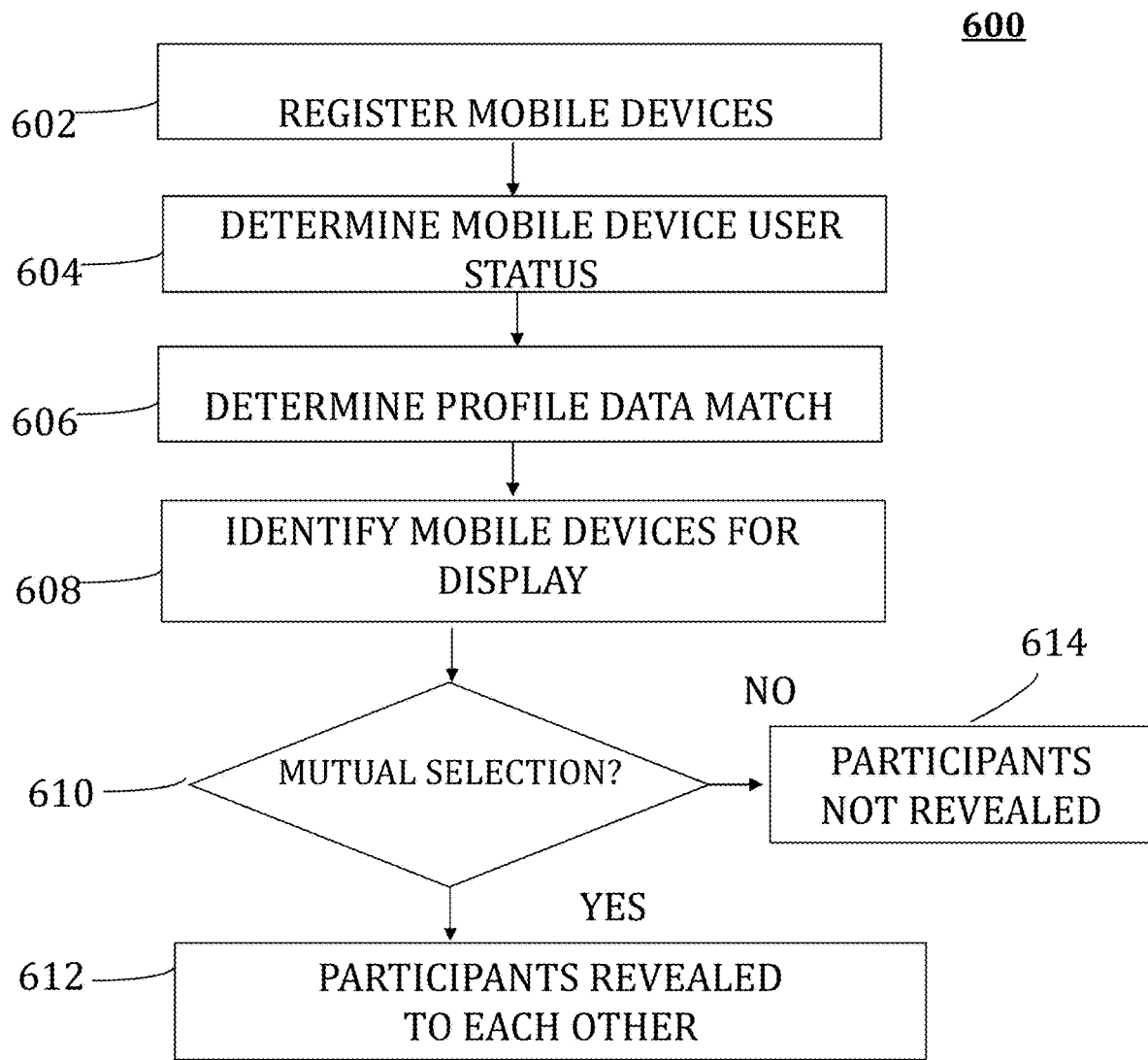
FIG. 6 is a flowchart illustrating a method of establishing a communication between mobile device users, in accordance with an embodiment.

FIG. 6 is a flowchart illustrating a method 600 of establishing a communication between mobile device users, in accordance with an embodiment. In describing the method 600, reference can be made to elements of FIG. 1. Some or all of the method 600 can be performed at the computer system 20 and/or one or more intermediary devices (not shown) at the network 16 of FIG. 1, for example, governed by instructions that are stored in a memory 24 of the computer system 20 and executed by one or more processors of the collaboration system 26 of the computer system 20 and/or one or more mobile devices 12. Some or all of the method 600 can be performed at one or more mobile devices described herein, for example, a processor and memory of a mobile device 12 of FIG. 1.

In addition to embodiments related to location-based scanning and matching described herein, the collaboration system 26 can establish communications between two or more mobile devices 12 not located in the same vicinity. Thus, match results can be generated based on profile data, search criteria, and so on, without a requirement that mobile devices be at the same or nearby locations. For example, a mobile device user may have extra time on his hands but have no contacts or interesting people, i.e., matches, who are in the same immediate area. The user in this example may wish to call a contact on the mobile device 12 who is located in a different location, but is available for a telephone chat, IM exchange, game, sharing mobile content, or other communication. However, it is typically not known whether such contacts are available for a chat or communication at a particular point in time. The method 600 can therefore be implemented to ensure that other registered mobile device users are available and willing to participate in a communication prior to being identified. Although mobile device contacts are mentioned, the systems and methods described herein can be applied to non-contacts or strangers registered with the collaboration system 26.

At block 602, mobile devices 12A and 12B of the mobile devices 12 register with the collaboration system 26. The mobile devices 12A, 12B can register in a similar manner as that described with respect to block 202 of FIG. 2. Repetitive details are therefore omitted for brevity.

At block 604, a status of each of the mobile devices 12A, 12B is determined. For example, a mobile device user can select at a mobile device 12 a displayed option regarding a status, for example, "available", "bored," or "game," or the like. Status options can include options that can be performed remotely, regardless of location, for example, playing an online game, as distinguished from status options described herein with reference to location-based embodiments, for example, meeting for coffee. The display of status options can indicate that the mobile device user is available for communicating with other registered mobile device users. By selecting a button or the like at a mobile device 12, an instruction is passed to the collaboration server 26 and the status selected by the user can be stored along with other profile data, for example, at the computer system 20.

At block 606, a profile data match is determined between two or more registered mobile devices 12 in response to the registered mobile devices 12A, 12B of block 604 selecting the same displayed status option. The collaboration system 26 can compare the selected status data, and/or other profile data corresponding to the mobile devices 12A, 12B and generate a match result based on the selected status option determined to be common to both mobile devices 12A, 12B, and/or other profile data such as user search criteria, interests, location, shared contacts, and so on. Other details of a profile data match can be similar to those described above with respect to FIG. 2. Therefore, repetitive details are omitted for brevity.

At block 608, one or more mobile devices 12 are identified for display at each mobile device 12A, 12B. The first mobile device 12A can be presented with a list of user profiles, each providing an identifier and/or other details regarding registered mobile device users who may have the same status as the first mobile device 12A at a particular moment, for example, other users who are bored, and so on. A displayed list may include actual contacts, secondary contacts, or any other users, real or created by the collaboration system 26, who are or aren't actually available to communicate. One of the identifiers on the presented list refers to the user of the mobile device 12B, which is determined from the profile data match result. One or more identifiers on the presented list may actually not have the same status. Instead, these identifiers are of people who have some probability of having the same status or could be believable by the user of the first mobile device 12A to have the same status. The list can include random people from the mobile device user's contact list or friend network, or can include registered users identified from a 2-hop network, or strangers from an H-hop network, where H>2. Each list item, including randomly chosen people, can be identified on the list as having a similar status. If multiple mobile device users have a same status as the first mobile device 12A, and multiple mutual matches are possible, for example, several users are identified from the profile data match result, then the system 26 may display some or all of the identified users, which may be limited to maximum number of users displayed, in accordance with an embodiment.

A second set of mobile devices are displayed at the second mobile device 12B as possibly having the same status in a similar manner as the list described with reference to the first mobile device 12A. Accordingly, one of the candidate users is the user of the mobile device 12A, which is likewise determined from the profile data match result.

The user at the first mobile device 12A and the user at the second mobile device 12B each can select one or more names or other identifiers on the presented list corresponding to a mobile device user with whom the user would like to communicate, in a manner similar to other approaches described herein.

Each mobile device user 12A, 12B has the option of selecting with whom they may be open to communicating at that time. Each selection made by the users of the first and second mobile devices 12A, 12B, respectively, can be stored at a table or the like at the memory 24 of the computer system 20. The collaboration system 26 can compare the selections made by the mobile device users to identify a mutual selection.

Accordingly, at decision diamond 610, a determination is made whether the mobile devices 12A, 12B select each other. Each user's selection is transmitted from their mobile device 12A, 12B to the collaboration system 26 and stored at a table or other format associated with the user's account. If the users mutually select each other, then the method 600 proceeds to block 612, where each mobile device user 12A, 12B is made aware of each other's identity. Here, the collaboration system 26 may transmit a message or signal to either or both mobile devices 12A, 12B informing them of each other's status, profile attributes, or other information. In other words, the users are alerted to the fact they share the same status via a message sent to their respective devices 12A, 12B only if each user mutually selects the other's profile. Users would then have the ability of pressing a button (e.g., call Bob now) to initiate a telephone call, play a game, send an instant message, share content, text message, or otherwise participate in a mode of communication well-known to those of ordinary skill in the art. Otherwise, the method 600 proceeds to block 614, where the identity of the users of the mobile devices 12A, 12B are not revealed to each other and each user may as example, receive a message indicating that they were not able to be connected with other user. Thus, instead of simply notifying one or both mobile devices 12A, 12B that they share the same status, the identities and statuses of the mobile device users are only revealed to each other after each of the alert recipients select the other of the recipients among a list of candidate users presented to each other.

Figure 7:
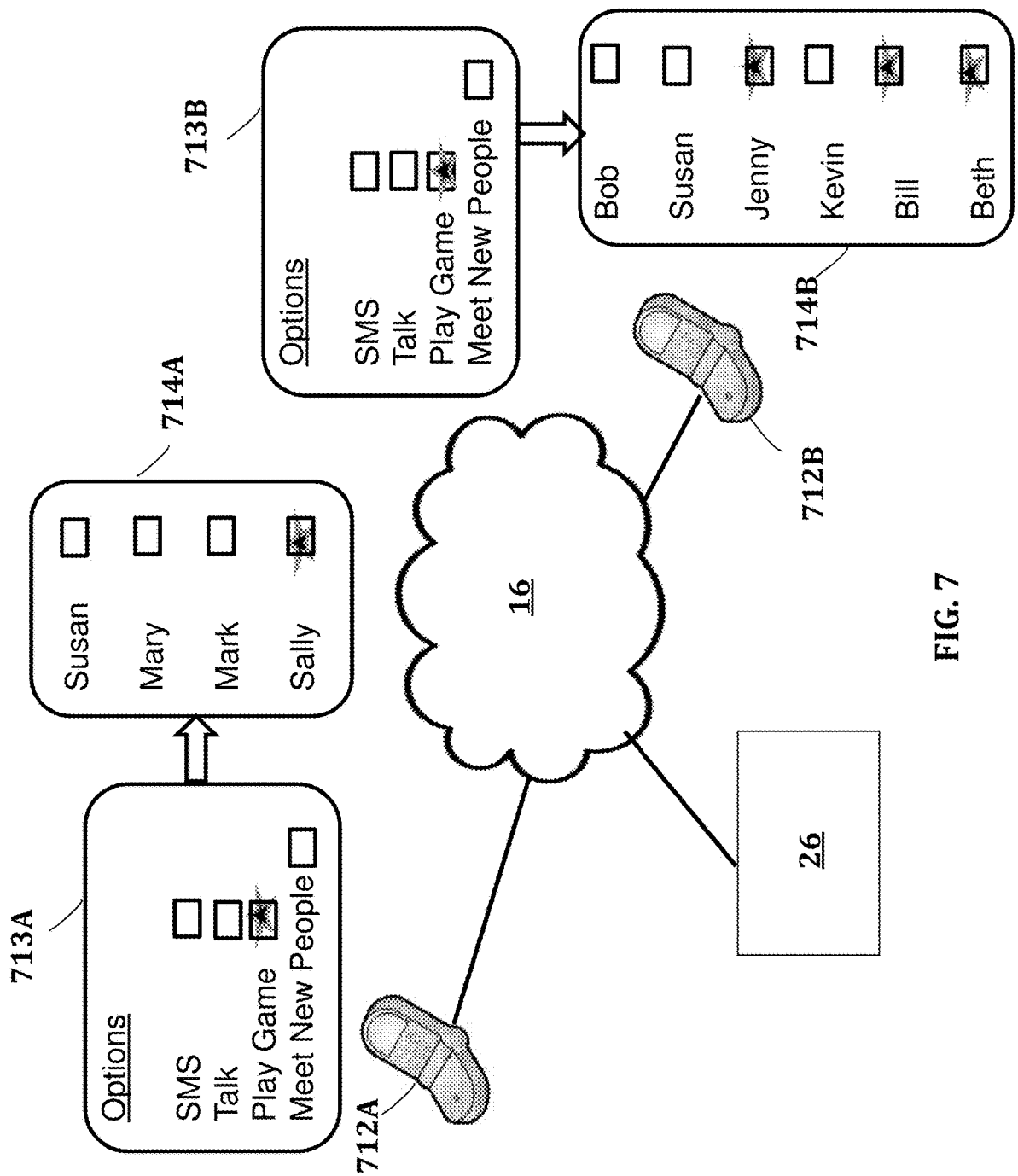
FIG. 7 is a diagram illustrating the establishment of a communication between two mobile devices at different locations, in accordance with an embodiment.

FIG. 7 is a diagram illustrating the establishment of a communication between two mobile devices 712A, 712B, at different locations, in accordance with an embodiment. In describing FIG. 7, reference is made at least to elements of FIGS. 1 and 6.

Mobile devices, for example, smartphone 712A and a second smartphone 712B, each register with the collaboration system 26 via a network 16. The user of the first smartphone 712A may be interested in establishing a chat, text session, or other communication with another available electronic device user, for example, a user at the smartphone 712B. The user of the second smartphone 712B is one of many different registered users with whom the user of the first smartphone 712A may wish to engage in a chat or other communication.

The collaboration system 26 can present to the first smartphone 712A status display 713A, 713B that includes a user-selectable set of status options providing the user's current status, for example, "I'm available" or "I'm bored." The users do not need to be at the same vicinity, but can be instead at remote locations but are each interested in the same activity. As shown in FIG. 7, the user of the first smartphone 712A selects the "Play Game" status option at the smartphone display 713B. The user of the second smartphone 712B also selects the "Play Game" status option at the smartphone display 713B. The collaboration system 26 can receive the status option selection data and update the profile data of each smartphone 712A, 712B accordingly.

In selecting one of the status options, the collaboration system 26 is made aware that the user is available for communication with contacts or other users registered with the collaboration system 26. The collaboration system 26 can also send a set of options 713B to the second smartphone 712B, or to other mobile devices registered with the collaboration system 26.

The collaboration system 26 can generate a match result from this data. For example, the collaboration system 26 can generate a match result in response to a determination that the users of the first and second smartphones 712A, 712B, respectively, share a same status, e.g., both users are bored as indicated by the selections made at the status displays 713A, 713B, respectively. The match result can include a list 714A of mobile device users that is displayed at the first smartphone 712A and a list 714B of mobile device users that is displayed at the second smartphone 712B. The first list 714A includes an identifier corresponding to the user of the second smartphone 712B, for example, the second smartphone user's contact name "Sally." The second list 714B includes an identifier corresponding to the first smartphone 712A, for example, the first smartphone user's contact name "Beth."

The lists 714A, 714B can include other mobile device identified in a match result, and can also include other mobile devices who may or may not be at the same location as the user and/or may or may not share a same status, but are nevertheless deemed to be "believable" to the user. In establishing a "believable" mobile device user for the list, the collaboration system 26 may employ one or more techniques, for example, among those described herein, to selectively choose which profiles are displayed on the mobile devices 712A, 712B so as to provide a level of 'believability' with respect to the shared status of a potential user on a list.

Each user may have the ability to select none, one, or a plurality of users from their list indicating who they would be open to communicating with at that particular moment. The system may allow them to select all or a subset of the users from the list in order to add additional uncertainty to the opt-in process. For example, if a mobile device 12 is displayed with five users for a user to select from, the user may be limited to selecting only four users. That way, if a mutual opt-in does not occur, either user may be able to assume it was the user not selected who was actually the user with a similar status. In this manner, a user may avoid a sense of rejection if they were to be able to select all of the users on their display but not receive a connection.

An "opt-in" can occur when the first smartphone user selects the second smartphone user's name, i.e., selects "Sally" on the first list 714A and the second smartphone user selects the first smartphone user's name, i.e., selects "Beth" on the second list 714B. Here, each smartphone 714A, 714B receives an alert, notification, or the like that the other is bored as indicated by the selection made at the status displays 713A, 714B, respectively. For example, when Beth and Sally select each other from the lists 714A, 714B, respectively, a notification is displayed at Beth's invite screen 716A indicating that Sally is interested in playing an online game, chatting, or otherwise communicating with Beth. Similarly, a notification is displayed at Sally's invite screen 716B that Beth is interested in playing an online game, chatting, or otherwise participating in a communication.

If a mutual selection occurs, i.e., if mobile device users 712A, 712B select each other from their respective lists, then the collaboration system 26 can generate a notification for each mobile device 712A, 712B. Each user can be presented with one or more communication options, for example, "Talk", "SMS", "Play a Game," etc., and can select an option, for example, initiating a telephone call, each invite screen 716A, 716B can display marketing-related information as described herein, for example, a coupon offered to each user for playing an online game.

As described above, mobile device users can elect whether they would like to be revealed to other users as well as how much information they wish to reveal, which may be released in a "Tiered" manner. In doing so, a user of a first mobile device identified in a match may activate (or pre-activate) certain security settings on the mobile device to control what information about them is displayed on the second user's device. For example, a user of a first mobile device included in a list may initially allow only a limited amount of information about them to display on the second user's device, such as the first user's screen name, or certain basic profile features. During a communication established after a match has been made between the first and second mobile devices, that is, perhaps initially 'blinded', each user may choose to unhide certain information about themselves and either reveal it or allow the other user to access the additional information. This may be performed in a variety of additive sequences. For example, if the first mobile device user wishes to engage with another matched user, for example, a third mobile device, the first mobile device user may first desire to send the third mobile device an anonymous instant message or other communication, without revealing the first user's full identity to the third user. After exchanging instant messages, if either the first user or the third user wishes to reveal information, they may alter the security settings to reveal some or all of their information (e.g., "Tiers"), e.g., reveal their screen name, or picture, their entire profile, or a link to their other social networking profile.

In another embodiment, prior to being matched and establishing communication with another user, a user can browse other users currently on the system and/or even communicate with them proactively. For example, if no alerts have been received during a period of time, a user may wish to casually and proactively browse their vicinity for users or browse for users with a shared status (e.g., "bored"). However, as earlier discussed, location and/or status privacy can be a concern. Here, the collaboration system 26 may employ a "blinded" approach to keep users anonymous while still allowing them to interact with each other prior to a match and establishing a communication. For example, nearby users on the network 16 may be displayed on a map on a user's display with only limited or scrambled information about them, for example, with only a generic icon, or actual locations may be intentionally offset on the user's map display, etc. For example, hungry users within the vicinity of a user may be displayed as "Hungry User" icons on the user's display and may appear a few blocks away from where they actually are. Other select but relatively anonymous attributes may be further displayed or available for viewing, such as "Professional Baseball player", etc. The attributes may be chosen by the mobile device users, or chosen dynamically by the system and tailored to the user's preference. For example, if a user attended Duke University, other users in the vicinity that also studied at Duke University may be tagged, or categorized, as "Duke Alumni" on that user's display, noting that other attributes about that user may be displayed on other users' displays based on their profiles. To establish a communication in accordance with an embodiment, a mobile device user can notify another user that he or she is interested in chatting or the like. The user may select a button or hyperlink at the mobile device display and/or enter an identifier of the other user. Or, the user may highlight or select a user on their map or display. If security settings allow for it, certain information stored in the other user's table may be transferred over the network and displayed on the user's mobile device. In one embodiment, this request triggers a list on each user's mobile device 12 from which they would each choose who they would like to meet, chat, play a game with, etc. right now, for example, according to one or more methods described herein. If the users don't choose each other, i.e., no opt-in, they are not connected and no further information is revealed. In another embodiment, if each user is comfortable enough with each other, they may instead choose to skip the list method (i.e., the opt-in step) and simply allow each of their identities to be instantly revealed, for example, either fully or in a tiered manner as described herein.

A user may highlight or select a user on their map or other display presented on the mobile device or choose them from a stored contact list, etc. If security settings are available, and allow for it, certain information stored in the other user's table may be transferred over the network 16 and displayed on the mobile device. The user may then have an option of selecting an "Instant Message" button. If selected, a chat window would open, allowing the user to enter content. Upon hitting a send or transmit button at the mobile device, the message is sent to the appropriate server (not shown) over the network 16. The message would be routed to the account of the other user, and the message would be transmitted over the network 16 to that user and displayed on their device or converted into a signal or alert. This exchange may be performed anonymously until each user decides to opt-in through an embodiment described herein. Messages may be stored in tables associated with each mobile device user and accessed at later times.

Another feature may allow the exchange of email messages or the like, which can allow one user to send an e-mail to another user, either using an e-mail address or by sending to the user screen name or other identifier and relying on the system to anonymously route the message to the e-mail address on record in the user's account. This allows one user to e-mail the other without knowing their actual e-mail address and/or the other user's actual identity. To perform this function, a user may highlight or select a user on their map or display or choose them from a stored contact list, etc. If security settings allow for it, certain information stored in the other user's table may be transferred over the network and displayed on the user's device. The user may then have an option of selecting an "Email" button. If selected, a text window can open, allowing the user to enter data content such as text, images, video, and so on. Upon hitting a send or transmit button at the mobile device, the message is output to the appropriate server over the network 16. The message can be routed to the account of the other user at the collaboration system 26. The message can be transmitted over the network 16 to that user and displayed on their mobile device or converted into a signal or alert.

Another feature may allow an exchange of voice-related data, whereby mobile device users can speak with each other. The system may allow one user to call the other, either using their phone numbers, or by using a Web-based method such as Voice-over-IP (VoIP) which may allow for mobile device users to chat without having to reveal their phone numbers. For example, after a mutual opt-in event and subsequent communication is established, two users may be able to conduct a voice call through the system blindly without having to reveal their actual phone numbers.

In another embodiment, mobile device users can create and manage contact lists that may include a variety of features, including, but not limited to, adding or deleting a contact, adding another user to their contact list while viewing them on a device display during or after a communication session, and/or accepting or denying a request to be added to another user's contact list.

For example, if a user is exchanging instant messages with another user and wishes to add them to a contact list, the user may have the option of selecting a button such as "Add to Contact List". When selected, the user's identifier and the desired contacts identifier are transmitted by the system over the network from the user to the desired contact. A message or indicator may then be displayed alerting them to the other user's request. If the other user approves the request, the other user may select a button such as "Accept", which transmits an instruction over the network 16 to server, for example, at the collaboration system 26, to associate the user's identifier with the user, and store the information on a table. When the user views the user's contact list, this contact, and any others stored on the table, can be transmitted over the network 16 and displayed in various ways, such as in a list of contact names.

In addition to storing the other user's contact ID in the table, additional information may also be stored in the table and related to the contact. For example, with respect to GeoTags or the like, a user may wish to store the location or coordinates of the interaction so that the parties to the interaction can remember where they met each other, e.g., drop a pin that marks where they crossed paths. Upon selecting this feature, for example, at the user's mobile device, the coordinates of the interaction may be stored on a table associated with this contact in the user's account. In another embodiment, a user may wish to capture and/or retrieve a contact's photo or other information about the contact to include it in their saved contact information. Upon selecting this feature, the data may be stored on a table associated with this contact in the user's account. A user can download other data such as electronic files related to other registered mobile device users, contact lists, and so on.

A user may wish to enter any other text or information at a mobile device about the contact, such as conversation notes, reminders, etc. Upon selecting this feature, the data may be stored on a table associated with this contact in the user's account, for example, at the collaboration system 26, or a server or other storage device in communication with the collaboration system 26. A business-related mobile device user may wish to save users in a contact list to serve as a customer list, and has a similar ability as other mobile device users referred to herein to retrieve and/or store data regarding other registered users. For example, business contact-related information can be stored in a table on the collaboration system 26, or a server or other storage device in communication with the collaboration system 26.

In other embodiments, a mobile device user may desire another user to assist in locating or connecting with other users that may be mutually interested in connecting with the mobile device user. In other words, a mobile device can serve as a proxy for another mobile device. For example, if a first user is interested in renting out an apartment, but a second user they have just met on the street is not a good fit, the first and second users may mutually agree that the second user will help the first user advertise the apartment. Instead of the first user handing them a flyer or other information, the first user may transition the search request to the second user electronically, e.g., provide the second user with a copy of the information for the second user to 'carry' with him or her. This information may be added to the second user's profile as temporary or appendix content. As the second user's mobile device roams, the mobile device incorporates the first user's search information into the second device's scanning activity. If the second user crosses paths with a third user that is searching for an apartment and meets the search criteria of the first user, the second user and the third user will each be alerted in accordance with embodiments referred to herein. In addition, the first user, even though no longer in the vicinity, may also be alerted, whereby either the second user or the first user remotely would have the opportunity to engage in a communication with the third user about the apartment. For example, the first user could send an IM to the third user. Accordingly, a notification can occur between the first and third user, the second and third user, and/or all three users. A notification can be generated even though a user is not physically present.

In an embodiment, a mobile device 12 is constructed and arranged to act as a roaming and automatic "referral" to other users or businesses, and gives the user the ability to easily acquire, carry and 'hand off' information about that user to other users with whom they may pass by or interact with. A reward system such as a finder's fee could be incorporated into the collaboration system 26. Thus, in the previous example when the second user locates and passes off the third user, the first user may have an option of rewarding them in some fashion. Such a function may include, but not limited to, the ability for the first user to transmit funds, an electronic gift certificate, or the like secured through this system, etc. to the second user, for example, to thank the second user for the referral.

Through this feature, mobile device users may expand their geospatial search coverage to that of all users who have agreed to serve as scouts or referrals for them. This could greatly expand the search and increase the chances of finding for whom or for what they are searching. For example, if a business would like to have a user advertise for them, they may provide them with content and thus as they roam, they act like a "virtual sandwich board", advertising that businesses' products or services. A reward could thus serve as a sales commission if the second user hands off the information to other users that may or may not ultimately conduct in a business transaction with the business. In a similar manner, contacts may be handed-off from one user to another user, thus serving as virtual business cards being passed around. This information may be initially blinded to limit personal information being handed off, and only when a user authorizes a new user to have their full contact information would that user's profile and content be fully accessible. For example, first and second mobile device users are contacts, and second mobile device user meets a new user, i.e., a third mobile device user, and wishes to contact the first user. The second user can perform a contact handoff, giving the third user enough information about the first user to contact the first user. Only after the first user feels comfortable about the third user and permits the third user to add the first user as a contact does the third user have additional or full information about the first user. In this example, the third and first user may each be presented a list of users as described herein and only if each selects the other, i.e., mutually opts-in, will a communication be established.

Another example operation of this function is as follows. After first and second registered mobile device users have been alerted of each other, and after they have initiated a connection, they may agree that the second user can assist the first user in locating other mobile device users that meet certain criteria that the first user is seeking. The first user may hand off information relating to the search by first selecting the second user on the mobile device display and selecting an option such as "Hand-Off a Search". The first user may then select the information in the first mobile device profile or account the first user wishes to hand off. This is accomplished by using the first user mobile device to access the collaboration server 26 over the network 16. Information selected is stored in a table and made available for transmission over the network. After submitting the request, the selected information is then transferred via the collaboration system 26 to the second user's profile or account and is stored in an associated table. The first user may instead use a near-field format wireless signal such as Bluetooth™ to transfer the content over to the second user, thus circumventing the need to access the network servers. This search information is then appended to or included in the scanning function performed by the network for the second user. If a third party user passes in the vicinity of the second user, an alert is performed informing them, and perhaps additionally the first user, about the third party and that a criteria match has occurred. The first user and/or the second user may contact the third user using the aforementioned messaging tools. Additionally, the third user may be alerted and use the communication tools to contact ether the first or second user. If the first user wishes to reward the second user for the referral, they may have an option of sending them a finder's fee or other financial payment.

The collaboration system 26 can include a range of user-controlled and/or automatic security features. For example, the collaboration system 26 can permit mobile device users to adjust visibility settings to control whether they are visible to other users. This may include a range of features including showing all profile information, showing partial profile information, showing no profile information and only a generic marker on a map, or hiding their presence altogether so that even their location is not shown on certain or all user's displays.

In an embodiment, mobile device users can create and use screen names to conceal their real names. When registering, the user enters a desired screen name and this is stored in a table on the server. Users may be required to use unique screen names. The system may have a function that helps the user generate a screen name (e.g., a random screen name generator). As the user engages with other users, for example, communicates with a user over instant messaging, etc. prior to an opt-in connection described herein, this screen name is used by the system to represent the identity of the user in order to preserve anonymity. Any information or data associated with this user would be stored in tables that are cross-referenced to this unique identifier.

In an embodiment, the systems and methods include a "blind messaging" feature. As users initially interact on the system, such as using the Instant Messaging feature, their screen name is used to protect their identity. During a messaging exchange, the server accesses the users profile and returns only their screen name. Any message or other data exchanged are stored in a table on the computer system 20 or other storage device and is associated with this screen name that then is related to the user's account.

In an embodiment, the collaboration system 26 may allow registered mobile device users 12 to modify or control how they are displayed, or what is displayed about them, on displays of other mobile device users 12 prior to and/or even after establishing a connection to further protect their privacy and safety. For example, an individual sitting in an airport may want the system 26 to detect who is in range of the user's mobile device 12, and that meets a set of predetermined search criteria to potentially engage with the individual, e.g., instant message or meet for a coffee. However, the individual may initially not want the other mobile device user to be able to physically locate the individual's precise location with the use of a displayed map or related information on the other user's mobile device 12. Thus, the system may "scramble" the actual location of the user, for example, display a user who is actually at Coordinate A as being located at Coordinate B at another user's display. Additionally, the user may only allow certain non-identifying information about them to be initially displayed at the other user's device, such as an icon (e.g., a sports team logo), or a picture (e.g., a sunset), or a status indicator (e.g., a "I Want Coffee") This would allow the users to initially communicate, for example, blindly chat, and only after a 2 party opt-in method is performed in accordance with an embodiment or if the first user is comfortable meeting the other user in person, may the individual either turn off a location scrambling feature at the individual's mobile phone or simply tell the other mobile device user where the individual is located. Through a web interface, desktop, or mobile device application or other network interface, the registered mobile device user can log into an account and through the mobile device user interface select the desired settings available. The settings can saved at a table on the computer system 20 or other storage device associated with their account. The collaboration system 26 can apply well-known techniques to identify users that meet each other's criteria. Prior to returning the actual location information for display, however, the system 26 may apply a technique to modify the perceived or viewed location that is displayed on the display of the user's mobile device 12.

In an embodiment, mobile device users may be able to control the visibility and/or access to outside links of information. For example, during a blind chat or during a 2 party opt-in method performed in accordance with an embodiment, they may initially only show visibility of links to other social network sites to those on their contact list, or only reveal it if they feel comfortable with another user during the course of an exchange. Based on their preference settings, the system 26 can selectively route and display the user information to other mobile devices 12 on the network 16.

The collaboration system 26 may use a variety of authentication methods for various purposes, such as controlling the availability of user information based certain criteria. For example, a mobile device user can prevent users above or below a predetermined age from ever being matched, occurring in a match list, and/or viewing the location of the mobile device user on a display. This feature would thus allow a young user to control the age of those that can see them, communicate with them, locate them, or use any other feature on the system, e.g., a young user could limit any user over 18 years old from seeing any or all of their information.

In an embodiment, a mobile device user can lock the type or amount of information being displayed on the network 16 that would otherwise be available for access. For example, a user may have the option of a "Quick Lock" button to immediately stop the display of the user's personal information on other mobile device displays. Upon selecting this feature, the collaboration system 26 can refrain from sending that user's data when transmitting data to be made visible on another user's mobile device display. Additionally, it may instruct the system to send false information, such as incorrect location coordinates or false profile information to throw the other user off.

In an embodiment, the collaboration system 26 can include multiple versions, each tailored to the needs of different user populations. For example, the collaboration system 26 can include a 'child' version of the system that restricts the ages of those users on the network 16, but can allow for adults or parents to create, manage, and have access to all of their information either through similar interfaces or interfaces and displays unique to the parent or guardian. The system may require age checks or other means of using third-party data of systems to verify and control the ages of users on the network. The collaboration system may have versions tailored to social networking, professional networking, dating, or the like.

In an embodiment, the collaboration system 26 can analyze if there are any mutual connections between two users and perhaps even how many degrees of separation they may have. For example, if two users are near each other that share a common contact, the system 26 may recognize this commonality and notify them of their extended relationship through their mutual friend. The system may use a variety of methods to search for these connections, such as scanning the system's database or using outside data sources such as other social or professional networking sites. The system may use other methods to identify any connections they may have, including, but not limited to using their photos or leveraging network based facial recognition software to search for any connections they may have. In these cases, the server may use the data associated with two users to perform search algorithms that may or may not use third-party databases, websites, or other data.

In an embodiment, the collaboration system 26 may allow for the conduction of transactions among, between, or on behalf of users. These may include financial or non-financial exchanges of value including, but not limited to the below example and functions. For example, two users may be alerted to the presence of each other and informed that one user is selling extra tickets they have to an event. The second user, who has advertised their interest in purchasing tickets using a headline or in their profile, and after a multi-party opt-in method is performed in accordance with an embodiment resulting in a communication, may elect to conduct a transaction with that user in which the first user exchanges the tickets for something of value from the second user. Through the user's interface, the second user can instruct the system 26, or a financial system in communication with the system 26, to transfer funds to the account of the first user. This exchange may be instant or use an escrow feature to hold funds until a mutually acceptable time such as when the user successfully uses the tickets and is inside the venue, knowing the tickets are authentic. The exchange may occur internally to the system and involved in moving internal funds, i.e., pre-deposited funds transferred into the second user's account by electronic transfer or credit card, or by transferring a payment from external financial institutions.

In an embodiment, the collaboration system 26 communicates with a computer of a third-party financial institution or the like to permit mobile device users to perform financial transactions, e.g., to local retailers, for event and movie ticket dealers. As a non-limiting example, after a 2 party opt-in method is performed in accordance with an embodiment, the two parties satisfying a match can each view the chat window and receive an electronic coupon displayed at the users' mobile devices 12. Each party can buy movie tickets to a local theatre using the coupon and/or using a link to a third-party online ticket seller.

A registered mobile device 12 can connect to a server, which can include the collaboration system 26, and which can be maintained by a service provider and can pass the server information about the user that may include, but not be limited to: time of day, date, user's name or unique identifier, user's geographic coordinates, user's profile information, and other information such as user's usage history, device type or software version, or any other information about the user. This data can be stored in a table on a network server, along with other data described herein. In establishing a communication between registered mobile devices that can include a financial transaction, one or both mobile device users may instruct the system 26 and/or other computer servers participating in the financial transaction, about the parameters of a desired transaction, including but not limited to the items they intend to exchange, the identify of each user, the value of exchange, whether or not they wish to use an escrow feature, payment method, etc. The data may be manually entered or entered in another fashion such as via voice recognition, with the use of peripherals, attachments or input devices, e.g., optical scanners, radio tag scanners, etc. The data associated with the transaction is stored in a table on the server, and the data are related to each user's account. If the user wishes to pay for the item with their banking information stored in a user account, the funds would be transferred to the other user's account. This may be performed by connecting to third-party banks or other financial institutions, or it may be performed within the system if funds or value have been pre-deposited and the user's have a balance of value available for use on the system and to be transferred to the other users account. The user interface of either user's mobile device or other user computer such as a desktop computer connected to the network 16 can include any of the currently available online banking or electronic funds transfer functions or additional functions and features to facilitate a transaction between users on the system.

As described herein, user information can be stored in a table(s) in the computer system 20, or a server or other computer platform in communication with the computer system 20. User data may include, but not be limited to: user profile and account information, search criteria/preferences to locate other users or points of interest, user location data or movement patterns, patterns of the connections among or between users and extended contact networks or social network graphs, user usage statistics, user transaction data, time and date information, usage data regarding the user or any other information about the user or their use of the system 26. The data from multiple users may be compiled, manually or automatically analyzed and sorted and a variety of written or graphic-based reports and outputs may be generated that may include, but not be limited to: maps that show time-based patterns of activity by users, heat maps that show time, frequency, or other cuts of data in an intensity map to facilitate interpretation, "user maps" that map users that share similar profiles or other characteristics, statistical summaries of various network, user, or other system data.

The collaboration system 26 may allow registered commercial users or businesses, e.g., retailers, to distribute content such as details regarding products or services to other mobile devices, in a real-time and targeted manner, based on any user data such as users' profile data, their preference data, their search data, their location data, etc. For example, a retailer that has access to user data on a real-time basis may be alerted that a user that meets a desired profile is going to walk or drive by their store. The retailer, either manually or through an automated function, may issue the user an electronic coupon or alert the user of a sale via a message, e.g., text, e-mail, instant message, etc. to entice them to enter the store. The system 26 may be automated, i.e., pre-programmed, or managed in real-time by the retailer. For example, the retailer may have an account on the system and be able to enter information about users to whom it desires to market its products. As the system 26 monitors the movement patterns of mobile devices 12 on the network 16, if there is a match the system 26 will automatically transmit the marketing materials to that user. Additionally, the retailer may have an interface such as a mobile device or computer that they use to more manually manage the marketing in a real time manner. For example, users may be able to access and monitor the user data real time, e.g., view users on a map or display, and manually select users to whom to send marketing materials. They could even use this real time data to walk out their store and personally engage with the user to get them to visit their business. For example, if a user provides a picture that is displayed publicly in his profile, then the retailer may use a mobile device 12 that displays the user picture and location to help the retailer to identify the user via his photo among the crowd of shoppers.

Through a web interface, desktop or mobile device application or other network interface, a commercial user such as a retailer can pre-register with a service provider to create an account profile and will provide the service provider with various data, content and/or uploads. The retailer may create marketing materials including text, graphics, or other marketing content in an offline fashion and then "upload" this content to their profile area on the server for subsequent management including but not limited to storing, editing and distribution. The content is stored at the collaboration system 26, or a storage device in communication with the system 26 in a table associated with the registered retailer profile. Alternatively, the retailer may use functionality included on the computer system 20, or a marketing server or the like in communication with the computer system 20, to create and manage their marketing content. This may include, but not be limited to text and graphic editing functionality.

A retailer may then distribute the marketing content to both registered and non-registered mobile devices. Non-registered users' geospatial data may be acquired through other means and third-party services. Marketing content may be distributed in a variety of manners including, but not limited to the following: 1. Banner Advertising: A retailer may desire to display the marketing content to select or all users, at any time and either on their mobile device or online as in their profile or account areas. 2. Text Message to Phone: The Retailer may desire to distribute the marketing content to select or all users (at anytime and either on a mobile device or online as in their profile or account areas). This may be accomplished a number of ways including, but not limited to distributing a text message that is uploaded to the server and then distributed to one or more registered mobile devices 12 directly via the server or via third-party network affiliate(s) to which the Customers mobile devices are in communication. 3. Instant Message: A retailer may desire to distribute the marketing content to select or all users, for example, at anytime and either on their mobile device or online as in their profile or account areas. This may be accomplished a number of ways including, but not limited to distributing an instant message that is uploaded to the server and then distributed to the user(s) directly via the server or via any third-party network affiliate(s) (such as Twitter®, AOL Instant Messenger®, Yahoo Instant Messenger™, Facebook™, etc.) to which the user's mobile devices, computers or other devices are connected. 4. E-mail Message: The retailer may desire to distribute the marketing content to select or all users, for example, anytime and either on their mobile device or online as in their profile or account areas. This may be accomplished a number of ways including, but not limited to distributing an e-mail message that is uploaded to the server and then distributed to the users directly via a server or via third-party network affiliate(s) (such as Yahoo™, Google™, etc.) to which the user's mobile devices, computers or other devices to which they have access are connected.

A commercial mobile device user may use other forms of creating and transmitting electronic data containing marketing content to users including, but not limited to: Bluetooth™ transmission to a mobile device that is within the vicinity of the commercial user. This may include both registered and unregistered users. Any other method of transmitting marketing content to a user for the purposes of trying to engage in a transaction between the commercial user and the other users. The retailer may transmit these marketing data real-time, or may also use stored user data on the server and select certain users to send data to at a later time. For example, they may be able to access a report or database that lists all the users of certain criteria that passed near their store, a competitor's store, or any other location of interest at a time of interest, and then target them with marketing materials or information, e.g., send an e-mail.

The collaboration system 26 may include any other function or feature that would allow or improve the ability for a user to detect, gain information about, communicate with, or otherwise engage with another user or location or feature or enhance their ability to manage their account, profile, user settings or enhance the use of the system 26. In addition to the functions and features previously described, the system may offer additional functions and features including, but not limited to: a. an ability to import content from other Websites, server locations, etc., b. language translators to convert content or communications from one language to another to facilitate interaction between two users, c. an ability to search the system for anything including people, objects, locations, etc., an ability for a user to view information about other users who have viewed information about that user (e.g., learn who has been looking at their profile information, etc.), e.g., an ability to perform a variety of functions related to E-mail including but not limited to sending offline messages, forwarding messages, replying to messages, linking to external e-mail accounts, etc., f personality quizzes, tests, and other personality assessments to increase accuracy of the matching algorithms or increase the probability that two users made aware of each other would have a higher probability of a positive interaction, g. an ability to provide feedback, comments, ratings etc. about other users, businesses, or any other feature indexed on the network. This may provide a number of utilities including warning users of a user that possesses negative traits, alerting or informing users of the quality of product or service at a business, etc. Instead of providing real-time alerts to a user, the system may provide a feature that allows the detection data to be saved as the user roams, and then provide the ability for the user to view summaries or other views that show detection data in some aggregated, historical, or other form. For example, a user may not wish to be notified real-time of the presence of every restaurant the user passes, or every other user, however, they may wish to have the system save these data to download or view a map of select content that meets certain criteria, for example, display a map of all the Chinese restaurants they have passed by in the past 7 days that have met their search or detection criteria. Users may have the ability to provide ratings or feedback about other users.

The collaboration system 26 can produce a variety of views including, but not limited to, dynamic maps that show the location (e.g., icons) of a user, locations of other users, and any other area feature in real time. Also, various user interfaces and displays may be used to facilitate the operation of functions and features, such as user-to-user communications (e.g. chat windows). Data from the system is manually requested or automatically pushed to the user's mobile device via the network or other method. Map views may be rendered that show the location of the user and other information including, but not limited to, icons that represent the location of other users or area features.

Different screen views may be created and/or maps may be adjusted in a variety of manners, such as adjusting scale, icons, content, layers, etc. Preference settings like these may be saved and stored on the server table and associated with the user's account. Content on maps may include, but not be limited to: a. A user's location may be represented by a blinking dot, their picture, a customizable icon, etc. b. Other users or features (some or all depending on various users' display settings and security settings) may also be shown as blinking dots, icons, by a picture, etc. c. users or features that meet the user's desired search criteria may be differentiated in some way on the user's display. For example, icons may be color coded (green=another user with a lot in common or a feature or status, e.g. hungry, that highly matches their search criteria), yellow=another user with some things in common or a feature that partially meets their search criteria, red=not much in common or a feature that does not generally meet their search criteria).

A user may select and view information about other users or features on the display through a variety of methods. For example, they may select another user or highlight their icon to display information about that user or feature. For example, if a first user selects the icon for a second user nearby, a request would be transmitted to the server through the network and information about the second user would be transmitted to the first user's mobile device and displayed. A window or text box may appear with basic information such as the second user's "nametag" or "headline", "greeting" "banner, screen name, and/or any other information that the second user has designated to be publicly viewed or viewable to the profile of the first user prior to a 2 party opt-in method is performed in accordance with an embodiment resulting in a communication. The amount of information displayed about the second user may be sequentially increased as the second user chooses to, i.e., following a certain increased level of comfort about the first user after instant messaging and getting to know each other and/or after a 2 party opt-in method is performed in accordance with an embodiment resulting in a communication, the second user may reveal additional information they wish to share about themselves. This increase in information may be granted as a link imbedded in their text messages, or the second user may have the ability to selectively increase their information visible to the first user with buttons or options on their display. For example, they may be able to select a particular user on their display or in their contact list and establish custom display settings for only that user, i.e., provide them with more information.

As described herein, various techniques, methods, algorithms, or the like can be applied to establish a match between mobile device users, which can be used to initiate a notification at each mobile device identified from the match result. A matching function can include a user-defined automatic match alert trigger or filter. Through an interface, a user may access the collaboration system 26 and enter search terms or phrases (for example, terms such as "hungry," "coffee," "Duke University," "looking for roommate," etc.), scanning and match preferences such as a desired attributes, match strength thresholds, scan distance, window of time each day to scan, scan only when moving, stop scanning when stationary for a period of time, and so on. The system 26 can store the search terms or other data, and automatically and continually execute a matching technique, method, algorithm, or the like based on the inputs and compare the search terms against the other stored user and/or virtual bulletin board data. The system 26 can identify matches and return a match result described herein.

Another matching function can include a user-defined random contact generator, referred to as "user roulette." Here, the system 26 may receive a request from a mobile device 12, or other electronic device such as a desktop computer under the control of a user, to match the user with other nearby users for the purpose of forming new connections. The request and any criteria for inclusion such as profile data can be stored at a storage device in communication with the collaboration system 26. The criteria can include but not be limited to a current distance from the user, attributes, how many other users to match, how often to match users, time of day to match users, and so on. A user via a mobile device 12 or other electronic device can execute a random match request, for example, selecting a hyperlink at a display on the mobile device 12, that transmits the request to the collaboration system 26, which can identify other registered mobile devices 12, and output relevant response data such as user profile data to the mobile device 12. The system 26 can output other notification data such as an introduction, coupons, and so on, which can be used when forming a connection Another matching function can include a user-defined virtual invitation, also referred to as a smart flier, virtual post, or virtual flier. Here, a user may post an electronic, geo-tagged 'virtual flier' to invite other users to join the user for an activity such as a meeting, soccer game, and so on. The user can create an electronic flier with trigger or attribute information described herein, and post it to the system 26. If another user is determined by the collaboration system 26 to match the attribute information, the other user can receive at a mobile device, or computer or other electronic device a message containing the information. For example, an employee of a company may be interested in a jog during lunch, and my post a smart flier that indicates that the employee is looking for fellow joggers. The data associated with the flier may include inputs such as activity type (run), time to post (12 p.m.), matching criteria such as search terms (run, runner), search time (9 a.m.-11:30 a.m.), distance from user (100 m), etc. The user can populate a form input on their mobile device 12, or upload a pre-designated flier to the mobile device 12. The flier data can be located at the mobile device 12 of the jogger, and alert other mobile device users within their vicinity of a jogger. Alternatively, the user may pin or post the information at a certain location, whereby when another user walks by the location, a trigger is activated at the user's mobile device 12, indicating a match result. If a user wishes to post the information at a location, the user may via a user-initiated request establish a tag with respect to the flier, which includes a current location or other data. The collaboration system 26 can associate the user's location at the time of the tag. The flier and/or data is then associated with the location and only users that pass within the vicinity of the location may receive a notification. Even if the user subsequently moves away from the location, the flier remains "posted" at the location, even though the mobile device 12 is no longer physically located at the location. Alternatively, a user may both post the flier at the location and carry the flier around. In any such example, after users are matched the 2 party opt-in method may be performed in accordance with an embodiment resulting in a communication.

The system 26 can be programmed by an administrator or user to create a set of administrative location triggers that match mobile device users with each other based on an administrator's matching preferences. The administrative location triggers can co-exist with, run simultaneously with, and/or complement user-defined triggers, for example, described herein. This feature permits users to be matched with other users with whom they would not otherwise be typically inclined to connect with, and allows an administrator, for example, a human resources manager, or an event manager, to "force" a match between users. An administrator can establish various triggers based on attributes, windows of time, distances, for example, to create an automatic match result when users are at a predetermined distance from each other.

An administrator can enter "matching terms" that the administrator wishes to use to identify current users who may benefit from knowing other registered users. Such terms can include but not be limited to user professional attributes such as current roles, past projects, experience, academic credentials, and so on or personal attributes and preferences such as interests and hobbies. Other terms can be applied to provide a number of people the administrator desires a user to identify or be matched with, and to form groups.

Matches or alerts between Users can be created based on criteria the system designated (i.e., it could override User search preferences) for purpose of facilitating group meet-ups and encouraging new connections/collaborations. For example, if a group coupon was 'floated' in a certain location, multiple Users may be alerted to its availability, and encouraged to group up with people that may be nearby to clam it (e.g., it is a bar that requires >5 people to show up to redeem it), thus Users may receive matches by the system to other Users that would not normally be triggered by their search settings, for the purpose of encouraging new people to connect with new people, form a new group, and come in and claim the coupon (and thus meet some new people and get a great discount).

Mobile device users may program multiple profiles for various situations (work hours, weekends, work colleagues, personal friends, strangers, etc.). The system may automatically display a certain profile when matching the User to another based on the attributes of that other user. For example, while walking around downtown during work hours, a User is matched with another user. The system may choose to automatically display each Users 'professional daytime profile' to the other as it is during work hours and the system designates each of them as professionals. However, while walking around at night during the weekend, the same user's 'personal' or weekend profile may be displayed to other Users as the system 26 knows it is a weekend and the two Users are both out socializing.

The system 26 may allow for "location scrambling" (e.g., as displayed on maps) to keep actual User location unknown to other users on map, only if User releases it/grants viewing rights to another will the other User then see their actual location on their map and be able to navigate to them. For example, after the two Users pass through the 2-way opt-in method (or perhaps before hand) they may see each other on a map display. However, if a User wants to protect their safety, they may have chosen a setting to 'scramble' their location on the map. Thus, the other User(s) would know they are generally in the area, but not see exactly where as their icon on the map would be purposely placed off-center of their location. If the User at any point comfortable letting the other User(s) know exactly where they are, they may turn off the scrambling and suddenly their exact location would be visible on the other User(s) maps/displays.

The system 26 may use social maps of Users that may visually provide information about their shared connections. For example, before or after the 2 way opt-in method, the User(s) may be able to see a social graph or description ("5 friends in common") indicating how many degrees of separation/common friends they may have with each other (for the purpose of assessing the safety and desirability of connecting with that other person).

The system 26 can be configured so that contacts added to a mobile device user contact list may include various information such as time of add, location of add, etc. For example, if two Users are matched with each other and grab coffee, they may choose to save each other to a contact list. In this case, the contact file/data may be 'smart' and include information such as the coordinates at which they met/had coffee, the time of day, etc.

Virtual bulletin boards (i.e., stations with various data tagged with that geospatial coordinates) may allow system 26 to detect a match between a user and the data and allow the User to "grab" and store the data as they walk by—triggered by a match between the User's profile and attributes of the data. They may later be able to view it, display it, share it, etc. An example application may include businesses that may create a location-based profile and market to those Users passing by around them (flyers, coupons, etc.)

A retailer or other user associated with a business establishment with a smart phone may create a profile and 'hang' coupons or other items virtually outside their store. As Users on the system walk around, they may detect these coupons.

"Smart briefcases or wallets" may be used by Users to manually or automatically collect and store geo-tagged data and/or marketing information from such virtual bulletin boards as they walk around. For example, a User may be walking around and the system 26 would match the User(s) with location based data (e.g., a coupon, etc.) and it would automatically 'pick up' or virtually tear off the coupon and place it in their virtual briefcase or wallet, either manually, whereby the User is alerted to the presence of the coupon or information hanging above them on the street, or automatically, whereby the system 26 recognizes the match and places the electronic coupon in their briefcase for them to view or use later.

Contact Handoffs/Referrals may allow a first mobile device user to virtually "grab" a second user's contact information and then as they walk around, the second user's contact information may trigger an event that only relates to and involves that other second user—such as a third user may be notified of that second users contact information without the first user being notified of the match. In one example, the system 26 matches two users and after going through the 2 way opt-in privacy step a communication is created and they meet up for coffee. One of them (Mike) is selling a bike, and tells the other (Bob) if they can help them find someone to buy it, they will give them a 10% commission. They leave, and as Bob walks around he may walk by someone (John) who is looking for a bike (based on a match of their profile information). The system 26 may recognize this as a match, matching John with Bob even though Bob doesn't have the bike, but he is 'carrying' information about the bike and has the opportunity to chat with John, tell him about it, and ends up selling it (connects John with the bike owner) and thus gets a commission for the 'sale'.

An administrator may run analytics and reports summarizing various matches made by the system 26 (e.g., in past 7 days), how many 2 way opt-in events were successful or not, how many coupons were offered and subsequently redeemed, etc.

While the invention has been shown and described with reference to specific embodiments, it should be understood by those skilled in the art that various changes in form and detail may be made therein without departing from the spirit and scope of the invention.

What is claimed is:

1. A system for establishing an electronic communication between at least two user computing devices, comprising:
   a processor that outputs a first list of computing device users for display on a first user computing device and outputs a second list of computing device users for display on a second user computing device that are among possible users of a potential match, wherein the first list includes a user of the second user computing device and the second list includes a user of the first user computing device;
   a processor that processes profile data including a first tier and a second tier, the profile data corresponding to each of the first user computing device and the second user computing device;
   a processor that receives search criteria established for a user of each of the first user computing device and the second user computing device;
   a processor that identifies a match that is an actual match between the first and second user computing devices based on the profile data and the search criteria of the first and second user computing devices;
   a processor that, in response to identifying the match, forms an electronic data path between the first user computing device and the second user computing device and informs the user of one of the first or second user computing devices of a presence of the other of the first or second user computing devices by providing at least one data element of the first tier of profile data of the other of the first or second user computing device to display in a first list on the one of the first or second user computing devices, wherein in the first tier, a first amount of information related to the profile data is displayed at the one of the first and second user computing devices in response to the match; and
   a processor that receives device selection data from the user of the other of the first or second user computing device, which in response to a selection of the one of the first and second user computing devices from a second list, authorizes the second tier of profile data of the other of the first or second user computing device to be displayed on the one of the first or second user computing devices, wherein the second tier is displayed only subsequently and in response to a mutual selection where the user of the second computing device is selected by the user of the first computing device and the user of the first computing device is selected by the user of the second computing device, wherein the second tier of the profile data includes a second amount of information, wherein the second amount of information is increased as compared to the first amount of information, and wherein the processor identifies from the second tier which information to extract and transmit for display in response to the user of the one of the first or second user computing devices selecting the other of the first or second user computing devices or the user of the other of the first or second user computing devices selecting the first of the first or second user computing devices.

2. The system of claim 1, wherein the first amount of information includes a screen name or picture.

3. The system of claim 1, wherein the second amount information includes user selection data, location, status or other user personal information.

4. A system for establishing an electronic communication between at least two user computing devices, comprising:
a processor that outputs a first list of computing device users for display on a first user computing device and outputs a second list of computing device users for display on a second user computing device that are among possible users of a potential match, wherein the first list includes a user of the second user computing device and the second list includes the user of the first user computing device;
a processor that receives and processes registration data regarding a user of the first user computing device and a user of the second user computing device and generates a user account that includes profile data of the registration data, location data regarding a location of the first and second computing devices, and a set of search criteria;
a storage device that stores the registration data, the location data, and the set of search criteria of each of the first and second user computing devices;
a processor that identifies one or more attributes of the registration data, the location data, and the set of search criteria that are common to the first and second user computing devices;
a processor that forms an electronic data path between the first user computing device and the second user computing device and informs the user of one of the first or second user computing devices of a presence of the other of the first or second user computing devices by providing at least one data element of a first tier of the profile data in the first list displayed on the one of the first or second user computing devices; and
a processor that receives selection data from the second list of the user of the other of the first or second user computing device, which authorizes the processor to provide a second tier of profile data of the other of the first or second user computing device to the one of the first or second user computing devices;
wherein the second tier of profile data of the one of the first or second user computing devices and the second tier of profile data of the other of the first or second user computing devices is displayed subsequently and only after a mutual selection where the user of the second computing device is selected by the user of the first computing device from the first list and the user of the first user computing device is selected by the user of the second user computing device from the second list, wherein the first tier of profile data includes a first amount of information and the second tier of profile data incudes a second amount of information, wherein the second amount of information is increased as compared to the first amount of information, and wherein the processor identifies from the second tier which information to extract and transmit for display in response to the user of the one of the first or second user computing devices selecting the other of the first or second user computing devices or the user of the other of the first or second user computing devices selecting the one of the first or second user computing devices.

5. A collaboration system for establishing a communication between a plurality of mobile devices, comprising:
a processor that receives registration data from a plurality of mobile devices, each mobile device including profile data;
a processor that outputs a first list of computing device users of the plurality of mobile devices for display on a first mobile device and outputs a second list of computing device users of the plurality of mobile devices for display on a second mobile device that are among possible users of a potential match, wherein the first list includes a user of the second mobile device and the second list includes the user of the first mobile device;
a processor that determines a match that is an actual match between profile data of a first mobile device and a second mobile device based on a common data profile element or search criteria of the first or second mobile device, the match further determined from location information of the first and second mobile devices;
a processor that generates and outputs to the first mobile device in response to the match of the first list of user identifications, the first list including an identification of a user of the second mobile device that includes a first tier of profile data of the second mobile device;
a processor that generates and outputs to the second mobile device in response to the match of the second list of user identifications, the second list including an identification of a user of the first mobile device that includes a first tier of profile data of the first mobile device; a processor that provides an option on the mobile device display for the user of the first mobile device to select or not to select the identification of the user of the second mobile device from the first list;
a processor that provides an option on the mobile device display for the user of the second mobile device to select or not to select the identification of the user of the first mobile device from the second list;
a processor that, in response to the users of each of the first and second computing devices selecting the identifications of each other, generates a notification at the first mobile device of at least one of a location or a second tier of profile data of the second mobile device and that generates a notification at the second mobile device of at least one of a location or a second tier of profile data of the first mobile device, wherein a common profile data element includes at least one of a shared same user status, user selections, personal details or a location at which the first and second mobile devices are currently located; and
a processor that establishes an electronic communication between the first mobile device and the second mobile device only in response to a mutual selection by the user of the first mobile device of the identification of the second mobile device user from the first list and selection by the user of the second mobile device of the identification of the first mobile device user from the second list, wherein the first tier of profile data includes a first amount of information and the second tier of profile data includes a second amount of information, wherein the second amount of information is increased as compared to the first amount of information, and wherein the processor identifies from the second tier which information to extract and transmit for display in response to the user of the one of the first or second mobile devices selecting the other of the first or second user computing devices or the user of the other of the first or second mobile devices selecting the one of the mobile computing devices.

6. The collaboration system of claim 5, further comprising a processor configured to not display the second tier of profile data of the first or second mobile device on the first or second mobile device, and further to not provide the first and second mobile device with a notification of at least one of the location or the second tier of the profile data of the first and second mobile device in response to a non-mutual selection comprising selecting by the user of the first mobile device the identification of the second mobile device user from the first list and the second mobile device user failing to select the identification of the first mobile device user from the second list.

7. The collaboration system of claim 5 wherein in the first tier, a first amount of information related to the profile data is displayed at the first and second mobile devices in response to the match, and in the second tier, a second amount of information greater than the first amount of information is displayed, the second tier displayed subsequently and only in response to the mutual selection.

8. A system for establishing an electronic communication between at least two mobile devices, comprising:
   a processor that identifies a match that is an actual match between first and second mobile devices of the at least two mobile devices in response to processing a combination of search criteria for a user of each of the first and second mobile devices, profile data of the first and second mobile devices, and location information of the first and second mobile devices;
   a processor that in response to the match generates and outputs to the first mobile device the first list of user identifications, the first list including an identification of the user of the second mobile device comprising a first tier of profile information, and generates and outputs to the second mobile device a second list of user identifications, the second list including an identification of the user of the first mobile device comprising a first tier of profile information; and
   a processor that receives a first electronic selection of the identification of the second mobile device from the first list on the first mobile device and a second electronic selection of the identification of the first mobile device from the second list on the second mobile device, and in response forms the electronic communication between the first and second mobile devices and displays on the first mobile device a second tier of profile information of the user of the second mobile device and displays on the second mobile device a second tier of profile information of the user of the first mobile device, wherein second tier of profile information may include user selection data, location, status or other user personal information, wherein the first tier of profile data includes a first amount of information and the second tier of profile data includes a second amount of information, wherein the second amount of information is increased as compared to the first amount of information, and wherein the processor identifies from the second tier which information to extract and transmit for display in response to the user of the one of the first or second mobile devices selecting the other of the first or second mobile devices or the user of the other of the first or second mobile devices selecting the one of the first or second mobile devices.

9. A system for establishing an electronic communication between at least two mobile devices, comprising:
   a processor that generates and outputs to the first mobile device a first list of user identifications, the first list including an identification of the user of the second mobile device, and generates and outputs to the second mobile device a second list of user identifications, the second list including an identification of the user of the first mobile device, wherein the processor processes profile data corresponding to the each of the first user computing device and a second user computing device, the profile data including a first tier and a second tier; and
   a processor that forms an electronic communication between the first mobile device and the second mobile device in response to the user of the first mobile device selecting the identification of the user of the second mobile device from the first list and the user of the second mobile device selecting the identification of the user of the first mobile device from the second list and authorizes the second tier of profile data to be displayed, and prevents an electronic communication from being formed between the first mobile device and second mobile device in response to the user of the first mobile device failing to select the identification of the user of the second mobile device from the first list or the user of the second mobile device failing to select the identification of the first mobile device user from the second list, wherein the first tier of profile data includes a first amount of information and the second tier of profile data includes a second amount of information, wherein the second amount of information is increased as compared to the first amount of information, and wherein the processor identifies from the second tier which information to extract and transmit for display in response to the user of the one of the first or second mobile devices selecting the other of the first or second mobile devices or the user of the other of the first or second mobile devices selecting the one of the first or second mobile devices.

10. A computer program for instructing a mobile device to establish a communication, comprising:
   computer program code for a user of a mobile device to enter profile data having a first tier and a second tier;
   computer program code that receives information about a match between profile data of the user of the mobile device and at least one other mobile device;
   computer program code that displays, in response to the match between profile data of the user and at least one other mobile device, a first list of user identifications, the first list including an identification of a user of the at least one other mobile device;
   computer program code that provides an option for the user to select or not to select the identification of the user of the at least one other mobile device from the first list of user identifications; and
   computer program code that provides for an electronic communication between the user's device and the at least one other mobile device in response to the user selecting the identification of the user of the at least one other mobile device and the user of the at least one other device user selecting the user from a second list of user identifications, including a display of the second tier of profile data, wherein the first tier of profile data includes a first amount of information and the second tier of profile data includes a second amount of information, wherein the second amount of information is increased as compared to the first amount of information, wherein the mobile device includes a first mobile device and the at least one other mobile device includes a second mobile device, and wherein the processor identifies from the second tier which information to extract and transmit for display in response to the user of the one of the first or second mobile devices selecting the other of the first or second mobile devices or the user of the other of the first or second mobile devices selecting the one of the first or second mobile devices.

11. A computer-implemented method for establishing an electronic communication between two user computing devices, comprising:

providing an application through which a user of a first user computing device enters registration data including profile data having a first tier and a second tier;

displaying received information about a match between one or more attributes of the registration data, location data, and a set of search criteria that are common to the first user computing device and a second user computing device, the information including a first list of user identifications, the first list including an identification of a user of the second user computing device;

displaying an option for the user to select or not to select the identification of the user of the second user computing device from the first list of user identifications; and controlling an electronic communication between the first user computing device and the second user computing device in response to the user selecting the identification of the user of the at least one other mobile device from the first list and the user of the at least one other mobile device selecting the user from a second list, including controlling a display of the profile data including the first tier and second tier to generate a notification informing the users of the first and second user computing devices that the user of the first user computing device selected the second user computing device and the second user selected the first user computing device, wherein the first tier of profile data includes a first amount of information and the second tier of profile data includes a second amount of information, wherein the second amount of information is increased as compared to the first amount of information, and wherein the processor identifies from the second tier which information to extract and transmit for display in response to the user of the one of the first or second user computing devices selecting the other of the first or second user computing devices or the user of the other of the first or second user computing devices selecting the one of the first or second user computing devices.

12. A collaboration system for establishing a communication between a plurality of mobile devices, comprising:

a database that stores profile data corresponding to each of a first user computing device and a second user computing device, wherein the database arranges the profile data into a first tier and a second tier; and a processor that:

outputs a first list of computing device users for display on the first user computing device and outputs a second list of computing device users of the plurality of mobile devices for display on a second mobile device that are among possible users of a potential match, wherein the first list includes a user of the second user computing device and the second list includes the user of the first user computing device;

receives search criteria established for a user of each of the first user computing device and the second user computing device;

identifies a match that is an actual match between the first and second user computing devices based on the profile data and the search criteria of the first and second user computing devices;

informs the user of one of the first or second user computing devices of a presence of the other of the first or second user computing devices by providing at least one data element of the first tier of profile data of the other of the first or second user computing device to display in the first list on the one of the first or second user computing devices;

receives device selection data from the user of the other of the first or second user computing device; and in response to a mutual selection where the user of the second computing device is selected by the user of the first computing device and the user of the first computing device is selected by the user of the second computing device, provides the second tier of profile data of the other of the first or second user computing device for display at the one of the first or second user computing devices, wherein the first tier of profile data includes a first amount of information and the second tier of profile data includes a second amount of information, wherein the second amount of information is increased as compared to the first amount of information, and wherein the processor identifies from the second tier which information to extract and transmit for display in response to the user of the one of the first or second user computing devices selecting the other of the first or second user computing devices or the user of the other of the first or second user computing devices selecting the one of the first or second user computing devices.

* * * * *